(12) United States Patent
El-Siblani et al.

(10) Patent No.: US 9,586,364 B2
(45) Date of Patent: Mar. 7, 2017

(54) APPARATUS AND METHOD FOR FORMING THREE-DIMENSIONAL OBJECTS USING LINEAR SOLIDIFICATION WITH CONTOURLESS OBJECT DATA

(71) Applicant: Global Filtration Systems, Dearborn Heights, MI (US)

(72) Inventors: Ali El-Siblani, Dearborn Heights, MI (US); Alexandr Shkolnik, Los Angeles, CA (US); Alexander Nam, Gelsenkirchen (DE); Mohamad Janbain, Wesel (DE)

(73) Assignee: Global Filtration Systems, Dearborn Heights, MI (US)

( * ) Notice: Subject to any disclaimer, the term of this patent is extended or adjusted under 35 U.S.C. 154(b) by 558 days.

(21) Appl. No.: 14/091,683

(22) Filed: Nov. 27, 2013

(65) Prior Publication Data

US 2015/0145177 A1      May 28, 2015

(51) Int. Cl.
*B29C 67/00*        (2006.01)

(52) U.S. Cl.
CPC .................................. *B29C 67/007* (2013.01)

(58) Field of Classification Search
None
See application file for complete search history.

(56) References Cited

U.S. PATENT DOCUMENTS

| | | |
|---|---|---|
| 4,849,910 A | 7/1989 | Jacobs et al. |
| 5,049,901 A | 9/1991 | Gelbart |
| 5,104,592 A | 4/1992 | Hull et al. |
| 5,447,822 A | 9/1995 | Hull et al. |
| 5,521,748 A | 5/1996 | Sarraf |
| 5,631,763 A | 5/1997 | Park |
| 5,753,171 A | 5/1998 | Serbin et al. |
| 5,780,070 A | 7/1998 | Yamazawa et al. |
| 5,876,550 A | 3/1999 | Feygin et al. |
| 5,885,511 A | 3/1999 | Heller et al. |

(Continued)

FOREIGN PATENT DOCUMENTS

| | | |
|---|---|---|
| DE | 19929199 A1 | 1/2001 |
| DE | 10256672 A1 | 6/2004 |

(Continued)

OTHER PUBLICATIONS

International Search Report and Written Opinion for PCT/US2014/0066120 dated Feb. 13, 2015.

(Continued)

*Primary Examiner* — Stella Yi
(74) *Attorney, Agent, or Firm* — Hansen IP Law PLLC

(57) ABSTRACT

An apparatus and method for making a three-dimensional object from a solidifiable material using a linear solidification device and contourless object data is shown and described. A voxel matrix is superimposed over an object model defined by three-dimensional object data to determine active voxels that intersect at least a portion of the object model. The active voxels are related to a path generation reference frame of an apparatus for making a three-dimensional object to generate solidification energy source event data that defines scanning (y) axis locations and/or solidification times at which a linear solidification device supplies solidification energy to a solidifiable material.

34 Claims, 23 Drawing Sheets

(56) References Cited

U.S. PATENT DOCUMENTS

| | | | |
|---|---|---|---|
| 5,902,537 | A | 5/1999 | Almquist et al. |
| 5,991,102 | A | 11/1999 | Oono et al. |
| 6,030,199 | A | 2/2000 | Tseng |
| 6,180,050 | B1 | 1/2001 | Arai et al. |
| 6,267,919 | B1 | 7/2001 | Tanaka et al. |
| 6,372,178 | B1 | 4/2002 | Tseng |
| 6,406,658 | B1 | 6/2002 | Manners et al. |
| 6,570,952 | B2 | 5/2003 | Paladini |
| 6,821,473 | B2 | 11/2004 | Hiizumi et al. |
| 7,006,887 | B2 | 2/2006 | Nagano et al. |
| 7,048,528 | B2 | 5/2006 | Ishikawa et al. |
| 7,636,610 | B2 | 12/2009 | Schillen et al. |
| 7,759,230 | B2 | 7/2010 | Im |
| 7,831,328 | B2 | 11/2010 | Schillen et al. |
| 7,906,414 | B2 | 3/2011 | Im |
| 2002/0011693 | A1 | 1/2002 | Leyden et al. |
| 2002/0153640 | A1 | 10/2002 | John |
| 2004/0118309 | A1 | 6/2004 | Fedor et al. |
| 2005/0208168 | A1 | 9/2005 | Hickerson et al. |
| 2008/0259228 | A1 | 10/2008 | Henningsen |
| 2010/0097662 | A1 | 4/2010 | Churilla et al. |
| 2010/0262272 | A1 | 10/2010 | Shkolnik et al. |
| 2010/0283188 | A1 | 11/2010 | Rohner et al. |
| 2011/0009992 | A1 | 1/2011 | Shkolnik et al. |
| 2012/0165969 | A1 | 6/2012 | Elsey |
| 2012/0195994 | A1* | 8/2012 | El-Siblani .............. B29C 67/007 425/174.4 |
| 2013/0001834 | A1* | 1/2013 | El-Siblani ........... B29C 67/0062 264/401 |

FOREIGN PATENT DOCUMENTS

| | | |
|---|---|---|
| EP | 1674243 A2 | 6/2006 |
| EP | 1876012 A1 | 1/2008 |
| EP | 2011631 B1 | 4/2012 |
| JP | 08150662 | 6/1996 |
| WO | 2012021940 A1 | 2/2012 |

OTHER PUBLICATIONS

Opposition to EP 2 011 631, dated Jan. 14, 2013.
European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Huang, et al., "On-line force monitoring of platform ascending rapid prototyping system" Journal of Materials Processing Technology 159 (2005) 257-264.
English translation of JP 08150662 abstract, from: http://www19.ipdl.inpit.go.jp/PA1/result/main/woYeaMaDA408150662P1.htm Jul. 15, 2011.
English translation of DE 10256672 from Lexis Nexis Total Patent.
English transiation of DE 19929199 from Lexis Nexis Total Patent.
International Search Report and Written Opinion for PCT/US2012/044398, dated Oct. 26, 2012.
Yamazawa, Kenji, et al., "High Speed UV Laser Beam Scanning by Polygon Mirror," pp. 223-230, The Institute of Physical and Chemical Research (Riken), (1997).
U.S. Appl. No. 13/774,355, As-Filed.

* cited by examiner

APPARATUS AND METHOD FOR FORMING THREE-DIMENSIONAL OBJECTS USING LINEAR SOLIDIFICATION WITH CONTOURLESS OBJECT DATA

FIELD

The disclosure relates to an apparatus and method for manufacturing three-dimensional objects, and more specifically, to an apparatus and method for using linear solidification with contourless data to form such objects.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

Certain techniques that have been proposed for making three-dimensional objects use linear solidification devices. Examples of such techniques are described in U.S. patent application Ser. No. 13/534,638, filed Jun. 27, 2012, and Ser. No. 13/774,355, filed Feb. 22, 2013, the entirety of each of which is hereby incorporated by reference. In accordance with such techniques, solidification energy is selectively scanned on an exposed surface of a solidifiable material along a scanning axis as the linear solidification device moves along a travel axis. The selective scanning is based on solidification energy source event data which are used to energize and de-energize the solidification energy source in the linear solidification device. The linear solidification device also includes a scanning device that scans solidification energy received from the source of solidification energy onto the solidifiable material along the scanning axis. In accordance with one method of making three-dimensional objects from a solidifiable material, the solidification energy source event data comprises string data in the form of a plurality of data strings, each of which includes a plurality of time values. The time values dictate times at which the solidification energy source is energized and de-energized. The coordination of the energization and de-energization of the solidification energy source with the operation of the scanning device is used to project solidification energy to desired locations along the scanning axis. Such techniques require a method for converting three-dimensional object data, such as STL (standard triangulation language) data and CAD data (e.g., IGES and STEP data) to solidification energy source event data, such as time values. STL data is ubiquitous among the techniques that are presently used to make three-dimensional objects. STL data defines the outer surface of a three-dimensional object using a plurality of polygons, more specifically, triangles One technique for converting three-dimensional object data to solidification energy source event data involves the creation of "contour data" by slicing the three-dimensional object data to yield a plurality of parallel slices through the object. The slicing operation is performed mathematically by determining the intersections between a plurality of slicing planes and the object along a defined axis. For each set of sliced data, contour data is created. One known form of contour data is known as "Common Layer Interface" or "CLI" data.

For each slice, the contour data defines a plurality of lines that collectively define one or more closed polygons. The contour data is then subdivided into linear strips with lengths along a scanning axis of a linear solidification device. The linear strips define the solidification energy source event data that determines the locations along the scanning axis at which the solidification energy source is energized and de-energized.

The use of slicing operations and contour planes has certain drawbacks. The generation of the contour data adds delay into the process which can prolong the time required to produce a three-dimensional object. In addition, in certain cases involving highly detailed, complex parts, the three-dimensional object data (e.g., STL data) that defines the shape of an object using a "mesh" of polygons often includes "mesh imperfections" that can ultimately yield inaccurate solidification energy source event data. Such mesh imperfections include overlapping mesh elements, flipped mesh elements with incorrect orientations, and geometrically degenerate mesh elements. As a result, a slicing plane may intersect multiple mesh elements at multiple locations (or at the same location) which are intended to define a single boundary location in three-dimensional space on the three-dimensional object. The intersection of the multiple mesh elements with the slicing plane ultimately creates invalid sequences of solidification energy source state events and undesirable geometrical artifacts in the finished object.

In addition, the solidification length per unit time as a linear solidification device scans solidification energy along the scanning axis can vary with the position along the scanning axis and/or with solidification time (i.e., the time during which a region of solidifiable material is exposed with scanned solidification energy). For example, certain linear solidification devices include a rotating polygonal mirror that deflects solidification energy onto the solidifiable material. For a given facet of the mirror, the solidification length per unit solidification time along the scanning axis tends to be smaller when solidification energy is deflected from the middle of the facet and larger when energy is deflected near the ends of the facet (primarily due to the changing angle of incidence of solidification energy on the solidifiable material which tends to change the size of the spot of solidification energy that is incident upon the solidifiable material at any one instant). As a result, an energy density and/or solidification length/solidification time distribution is created along the scanning axis, which can produce inaccuracies in the finished three-dimensional object. Thus, a need has arisen for an apparatus and method for forming three-dimensional objects which addresses the foregoing issues.

BRIEF DESCRIPTION OF THE DRAWINGS

The disclosure will now be described, by way of example, with reference to the accompanying drawings, in which.

Like numerals refer to like parts in the drawings.

DETAILED DESCRIPTION

Figure 1A:
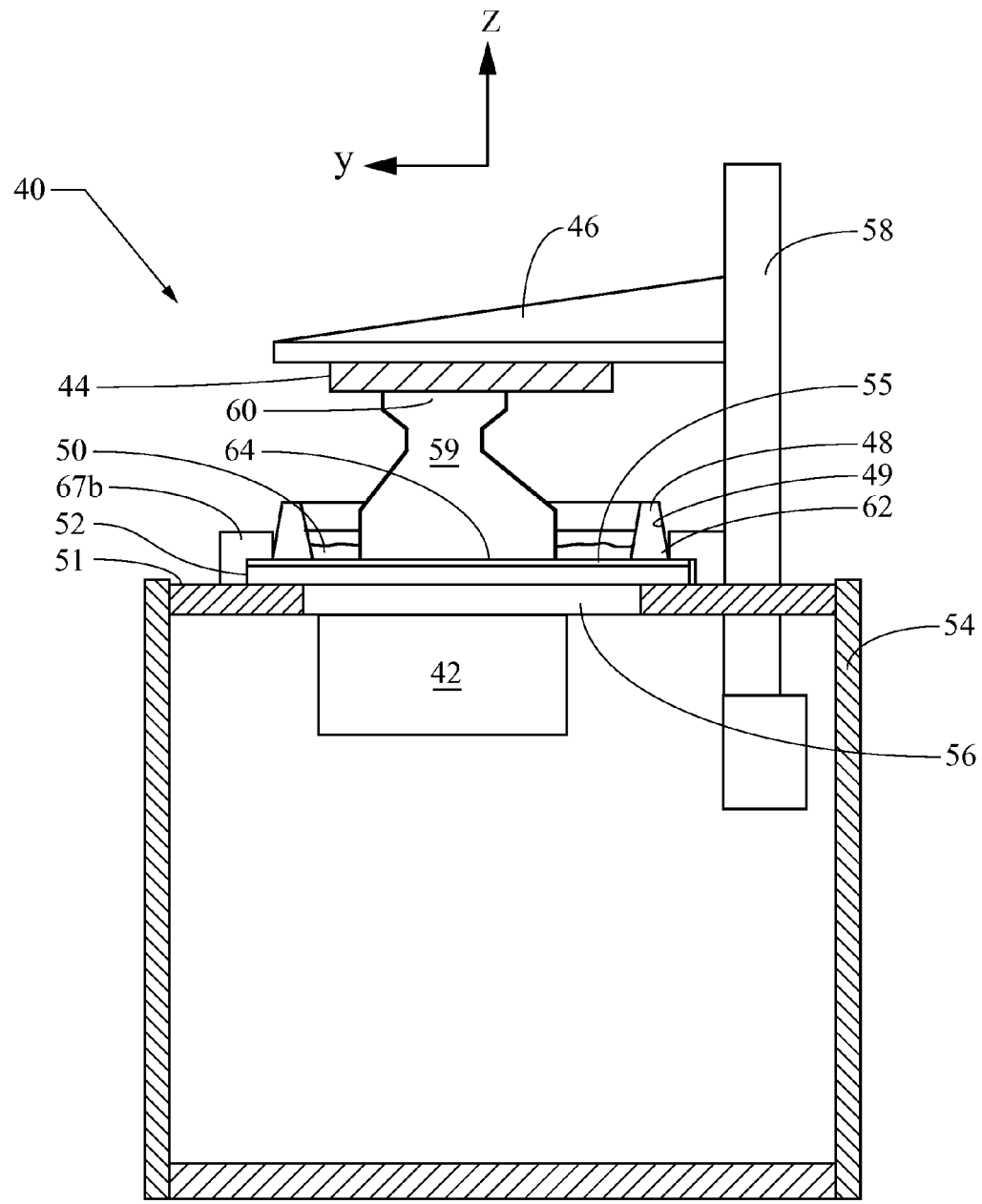
FIG. 1A is a side elevation schematic view of a first exemplary apparatus for making a three-dimensional object using linear solidification and contourless object data.

The Figures illustrate examples of an apparatus and method for manufacturing a three-dimensional object from a solidifiable material. Based on the foregoing, it is to be generally understood that the nomenclature used herein is simply for convenience and the terms used to describe the invention should be given the broadest meaning by one of ordinary skill in the art.

The apparatuses and methods described herein are generally applicable to additive manufacturing of three-dimensional objects, such as components or parts (discussed herein generally as objects), but may be used beyond that scope for alternative applications. The system and methods generally include a linear solidification device that applies solidification energy to a solidifiable material, such as a photohardenable resin. The linear solidification devices apply solidification energy in a generally—and preferably substantially—linear pattern across an exposed surface of the solidifiable material and also move in a direction other than the one defined by the length of the linear pattern while applying solidification energy. In certain examples, the linear solidification device includes a scanning device that deflects received solidification energy in a scanning pattern. Such scanning devices include without limitation rotating polygonal mirrors and linear scanning micromirrors.

In accordance with one aspect of the present disclosure, a method of making a three-dimensional object is provided which comprises receiving three-dimensional object data representative of a three-dimensional object and identifying active voxels (i.e., "volumetric pixels") by determining intersections between voxels in a three-dimensional voxel matrix and locations of a model of the three-dimensional object. Each voxel has a set of coordinates in a three-dimensional coordinate system. The model is defined by the three-dimensional object data, and the three-dimensional object data comprises a plurality of three-dimensional object data items, each three-dimensional object data item having a set of coordinates in the three-dimensional coordinate system. The method further comprises generating a plurality of sets of solidification energy source event data based on the active voxels, wherein each set of solidification energy source event data corresponds to a linear solidification device scan line and a layer of the three-dimensional object. In accordance with a second aspect of the present disclosure, a non-transitory computer readable medium is provide which has computer executable instructions stored on it, and when executed by a computer processor, the computer executable instructions perform the step of generating the plurality of sets of solidification energy source event data. In optional embodiments of the second aspect, the linear solidification device comprises a laser diode in optical communication with a rotating energy deflector, and the linear solidification device travels along a travel axis as it selectively transmits solidification along the scanning axis.

In optional embodiments of the first and second aspects, the three-dimensional object data comprises a plurality of polygon data sets, such as triangle data sets. In further optional embodiments of the first and second aspects, the voxel matrix comprises a plurality of voxels each having a first dimension dx that corresponds to a scan line gap along a travel axis direction of a linear solidification device, a second dimension dy that corresponds to a minimum feature size along a scanning axis direction of the linear solidification device, and a third dimension dz that corresponds to a layer thickness of the solidifiable material. In additional embodiments of the first and second aspects, the solidification energy source event data items comprise time values at which the energization state of the source of solidification energy changes. One exemplary form of such solidification energy source event data is a string of CPU tick values, wherein each CPU tick value indicates a time at which the energization state of a source of solidification energy changes from ON to OFF or vice-versa.

In yet further optional embodiments of the first and second aspects, the method further comprises calculating a plurality of sets of modified solidification energy source event data comprising a plurality of sets of modified solidification energy source event data values, wherein each modified solidification energy source event data value corresponds to an original solidification energy source event data value and a position along the scanning axis. In still further optional embodiments of the first and second aspects, the plurality of sets of modified solidification energy source event data are calculated based on a compensation function that is based on variations in solidification energy along the scanning axis. In specific examples, the compensation function is expressed as a solidification length along the scanning axis per unit solidification time as a function of solidification time.

Figure 3A:
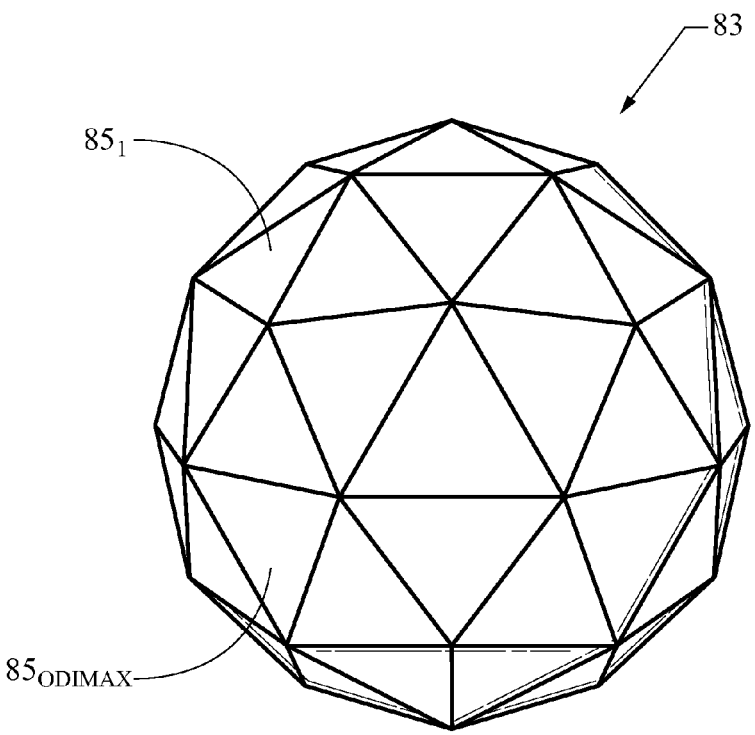
FIG. 3A is a graphical depiction of a first example of STL data comprising a plurality of triangles used to define a spherical object.
Figure 3B:
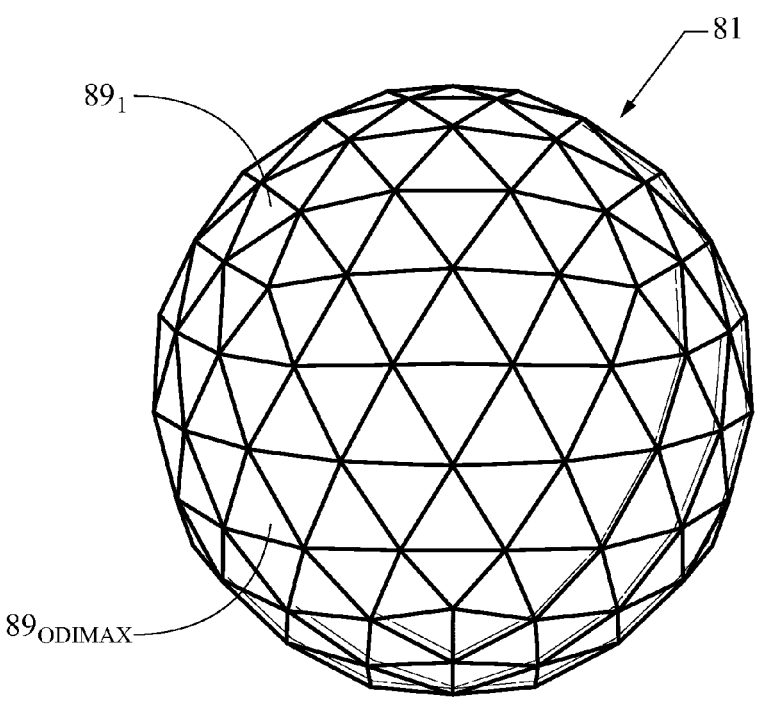
FIG. 3B is a graphical depiction of a second example of STL data comprising a plurality of triangles used to define a spherical object.

As used herein, the phrases "three-dimensional object data" and "three-dimensional object data items" refer to object data and object data items, respectively, that have coordinates in three dimensions. One example of three-dimensional object data is STL data. A set of STL data defines a three-dimensional object model by using three-dimensional object data items that comprise polygon data sets wherein each polygon data set defines a polygon in three-dimensions. In STL data, the polygon is typically a triangle. Each triangle is three-dimensional and comprises vertices with x, y, and z coordinates as well as a facet normal, which is a vector perpendicular to the triangle facet with a length of 1.0 unit. The facet normal has three coordinates that define its location on the facet of the triangle. FIGS. 3A and 3B graphically depict a model of a sphere defined by STL data. The sphere model 83 of FIG. 3A comprises a plurality of triangles, each of which may be assigned an "object data index" or "ODI" to uniquely identify it. In the example of FIG. 3A, triangles 85 have ODI values ranging from 1 to $ODI_{max}$ where $ODI_{max}$ is the largest object data index value for any of the triangles 85. Correspondingly, sphere model 81 comprises triangles 89 which also have ODI values ranging from 1 to $ODI_{max}$. As the figures indicate, increasing the number of triangles (and hence, the value of $ODI_{max}$) yields a sphere model with greater resolution and which more accurately represents an actual sphere.

In accordance with a third aspect of the present disclosure, a method of forming a three-dimensional object from a solidifiable material is provided which comprises providing a source of the solidifiable material, providing a linear solidification device, providing a build platform, and generating voxel data representative of the three-dimensional object. Each voxel corresponds to a set of coordinates in a three-dimensional reference coordinate system and has a first dimension equal to a scan line gap dx of the linear solidification device along a travel axis, a second dimension equal to a minimum feature size of the linear solidification device along a scanning axis, and a layer thickness dz which is an amount by which a build platform moves following the solidification of a layer of solidifiable material.

In optional embodiments of the third aspect, the reference coordinate system has a first axis, a second axis, and a third axis, and the step of generating voxel data representative of the three-dimensional object comprises providing an object model comprising object model data items in the reference coordinate system, the voxel matrix comprising a plurality of voxels, each voxel in the voxel matrix having a first dimension along the first axis equal to dx, a second dimension along the second axis equal to dy, and a third dimension along the third axis equal to dz, and the method further comprises identifying voxels in the voxel matrix which intersect any of the object model data items. In other optional embodiments of the third aspect, the method further comprises generating a plurality of sets of solidification energy source event data based on the voxel data, wherein each set of solidification energy source event data corresponds to a linear solidification device scan line and a layer of the three-dimensional object. In certain examples, the solidification energy source event data comprises a plurality of time values at which the energization state of a solidification energy source changes (i.e., from OFF to ON or vice-versa). In further optional embodiments of the third aspect, the step of generating a plurality of sets of solidification energy source event data based on the voxel data comprises identifying consecutive sequences of active voxels along the second axis at fixed locations along the first and third axes in the voxel matrix.

In accordance with a fourth aspect of the present disclosure, an apparatus for making a three-dimensional object from a solidifiable material is provided. The apparatus comprises a source of the solidifiable material, a build platform movable along a build axis, and a non-transitory computer readable medium having computer executable instructions stored thereon which perform the step of generating voxel data representative of the three-dimensional object when executed by a processor. The apparatus further comprises a linear solidification device. During an object solidification operation, the linear solidification device selectively scans solidification energy onto the solidifiable material along a scanning axis based on the voxel data as the linear solidification device moves along the travel axis. In optional embodiments of the fourth aspect, the step of generating voxel data representative of the three-dimensional object comprises generating the voxel data from three-dimensional object data. In other optional embodiments of the fourth aspect, when executed by a processor, the instructions perform the further step of generating solidification energy source event data from the voxel data. In additional optional embodiments of the fourth aspect, the solidification energy source event data comprises time values at which the energization state of the solidification energy source changes (e.g., from OFF to ON or vice-versa).

In accordance with a fifth aspect of the present disclosure, a method of correcting solidification energy source event data is provided. The method comprises providing a set of solidification energy source event data comprising a plurality of solidification energy source event data items, each of which corresponds to a position along a scanning axis. The method further comprises generating a set of corrected solidification energy source event data comprising a plurality of corrected solidification energy source event data items based on a varying solidification energy density profile along the scanning axis. In certain embodiments, the variation in solidification energy density is compensated for using a compensation function relating solidification length along the scanning axis per unit solidification time to scanning axis position and/or solidification time. In optional embodiments, the plurality of solidification energy source event data items comprises a plurality of time values at which the energization state of the solidification energy source changes, and the plurality of corrected solidification energy source event data items comprises a plurality of corrected time values at which the energization state of the solidification energy source changes.

In further optional embodiments of the fifth aspect, each corrected time value is calculated using a compensation function c(t) that relates solidification length along a scanning axis per unit solidification time to solidification time.

In yet another optional embodiment of the fifth aspect, the method further comprises solidifying a plurality of objects during an equal solidification period at varying positions along the scanning axis and determining the function c(t) based on the measured lengths of the objects along the scanning axis.

FIG. 1A depicts a simplified, schematic view of a system 40 for making a three-dimensional object 59 from a solidifiable material 50. System 40 uses a linear solidification device 42 to selectively solidify sections of a solidifiable material along a scanning (y) axis as the linear solidification device 42 moves along a travel (x) axis (not shown in FIG. 1A but would be orthogonal to the page) and is one example of a system that can use contourless object data of the type described herein to guide the selective solidification process. The system 40 of FIG. 2 uses an "upside down" build process in that the object 59 is suspended from build platform 44 and grows in the negative build (z) axis direction while the build platform moves in the positive build (z) axis direction, such that the top of the object is oriented beneath the base of the object (which is proximate build platform 44).

System 40 includes a housing 54 used to support a solidifiable material container 48, a linear solidification device 42, and a build platform 44. Solidifiable material container 48 comprises sidewalls 62 and a bottom that comprises a rigid or semi rigid solidification substrate 52 that is transparent and/or translucent with a film 55 coating adhered to its upper surface. FIG. 1A is provided to illustrate the basic arrangement and relationship of the linear solidification device 42, housing 54, solidifiable material container 48, and build platform 44. In FIG. 1A, object 59 includes a build platform contact surface 60 that is adhered to build platform 44.

Solidification substrate 52 is held in frame sections 67a (not shown in FIG. 1A) and 67b so as to be positioned over opening 56 in the upper surface 51 of housing 54. During an object building process an exposed surface 64 of the partially-completed three-dimensional object 59 is immersed in solidifiable material 50 so that a desired layer thickness of solidifiable material is provided between the exposed object surface 64 and the film 55 coated on the solidification substrate 52. Solidification energy (e.g., UV or visible light) is projected upwardly along the build axis (z) direction through the solidification substrate 52 and film 55 to solidify the desired layer thickness of solidifiable material in contact with the film 55.

System 40 includes a motor (not shown) and translation assembly for translating linear solidification device 42 along the travel (x) axis as well as a motor and translation assembly for translating build platform 44 and build platform support 46 along the build (z) axis. One or more controllers and/or microcontrollers (not shown) are provided to selectively activate the motors and to selectively scan solidification energy along the scanning (y) axis based on solidification energy source event data, as described further below. In preferred examples, the solidification energy source event data is generated by performing a voxelization process on a model of the three-dimensional object 59.

Figure 1B:
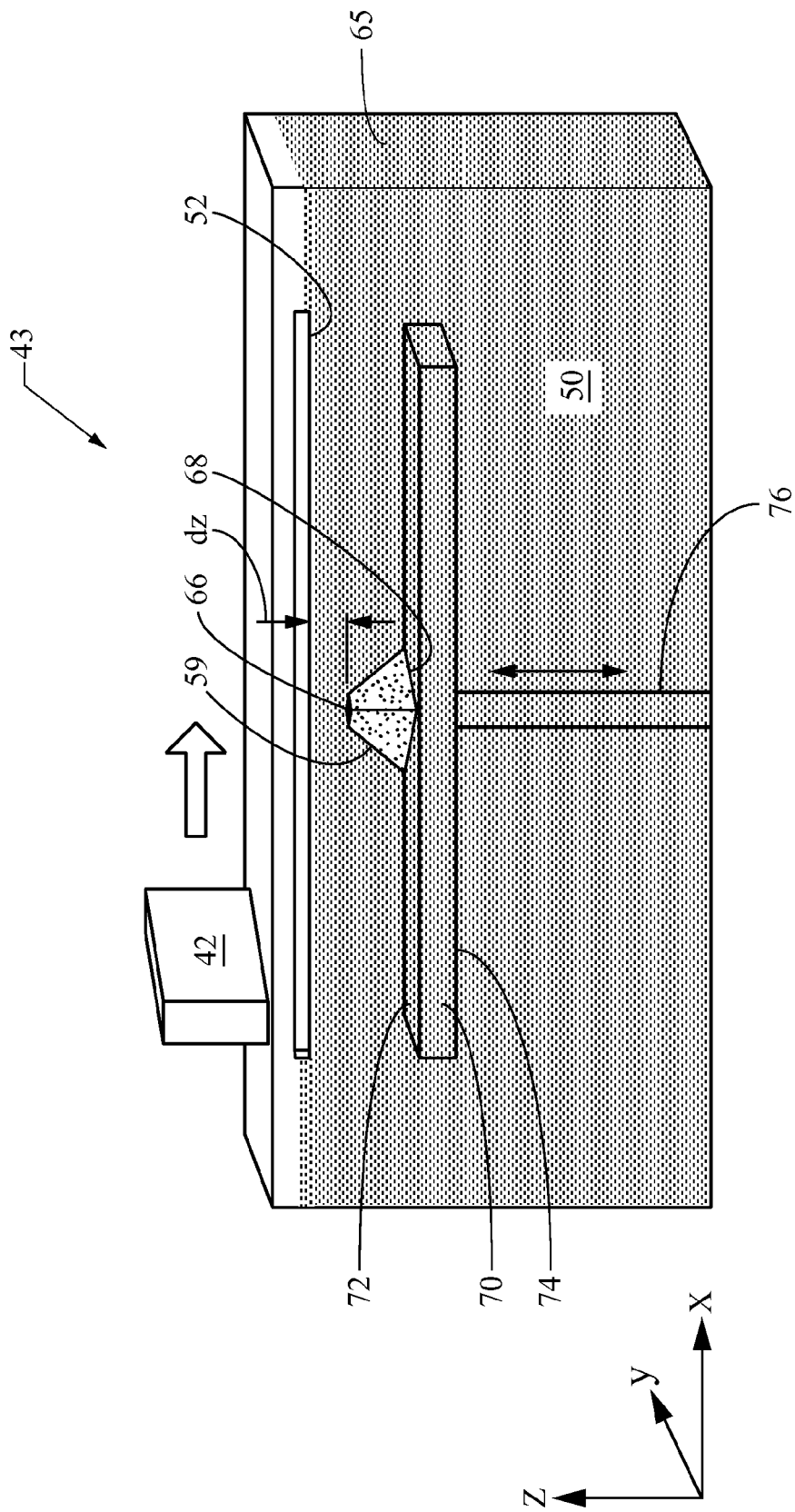
FIG. 1B is a perspective schematic view of a second exemplary apparatus for making a three-dimensional object using linear solidification and contourless object data.

An alternate system 43 for making a three-dimensional object from a solidifiable material is depicted in FIG. 1B. System 43 uses a "right-side up" build process in which the three-dimensional object 59 is progressively built in the positive direction along the build (z) axis as the build platform 70 moves in the negative direction along the build (z) axis so that the top of the object 66 is above the bottom of the object 68, which is proximate build platform 70. As with system 40, system 43 includes a linear solidification device 42 that selectively scans solidification energy along a scanning (y) axis while traveling along a travel (x) axis. Three-dimensional object 59 is built on build platform 70 which progressively moves downward along the build (z) axis during an object build process. Three-dimensional object 59 is progressively built by successively solidifying a series of layers of solidifiable material 50. Following the solidification of each layer, the build platform 70 moves downward along the build (z) axis by a layer thickness amount dz to allow fresh unsolidified material to fill the space between the upper-most portion 66 of the partially formed object 59 and a solidification substrate 52. Solidification substrate 52 is a rigid or semi-rigid structure that is generally planar and which is transparent and/or translucent to solidification energy transmitted by linear solidification device 42. Solidification energy from linear solidification device 42 travels through the solidification substrate 52 and contacts the solidifiable material 50, causing it to solidify in a pattern dictated by the pattern in which the linear solidification device 42 selectively scans solidification energy along the scanning (y) axis while traveling along the travel (x) axis.

Build platform 70 includes an upward facing surface 72 that is in facing opposition to a downward facing surface of solidification substrate 52. Build platform 70 also includes a downward facing surface 74 that is opposite upward facing surface 72. The bottom 68 of object 59 (or removable supports attached to the bottom of the object) rest on and adhere to upward facing build platform surface 72. Build platform shaft 76 is operatively connected to a motor and translation assembly (not shown) that moves the build platform shaft 76 and build platform 70 along the build (z) axis. Solidifiable material 50 is held in container 65 in which the build platform 70 is movably disposed. Linear solidification device 42 is operatively connected to a motor and translation assembly (not shown) that translates linear solidification device 42 along the travel (x) axis. One or more controllers or microcontrollers (not shown) selectively activate the motors and also selectively provide solidification energy from the linear solidification device 42 to the solidifiable material along the scanning (y) axis based on solidification energy source event data generated by voxelizing three-dimensional object data representative of the object 59. The build platforms 44, and 70 are generally planar and moveable along the build (z) axis only. However, other build platforms may be used. U.S. patent application Ser. No. 14/051,801, filed Oct. 11, 2013, describes a build platform that is curved along the travel (x) axis direction and which moves in trochoidal patterns along the travel (x) and build (z) axes while rotating about a rotational axis parallel to the scanning (y) axis. The apparatuses for making three-dimensional objects described in U.S. patent application Ser. No. 14/051,801 may also be used in accordance with the present disclosure, and the entirety of the application's contents are hereby incorporated by reference.

As indicated previously, in certain examples solidifiable material 50 such as a photohardenable resin is provided under (or over) substantially rigid or semi-rigid substrate 52 to receive solidification energy transmitted through substrate 52. Solidification substrate 52 is generally rigid or semi-rigid and transparent and/or translucent. Solidification substrate 52 is also substantially permeable to the energy supplied by linear solidification device 42. In certain examples, it is preferred that the energy from linear solidification device 42 pass through solidification substrate 52 without a significant diminution in transmitted energy or a significant alteration of the energy spectrum transmitted to the solidification material relative to the spectrum that is incident to the upper surface of solidification substrate 52. In the case where the energy from solidification energy source 126 is light (including non-visible light such as UV light), solidification substrate 52 is preferably substantially transparent and/or translucent to the wavelength(s) of light supplied by linear solidification device 42.

One example of a rigid or semi-rigid solidification substrate 52 is a translucent float glass. Another example is a translucent plastic. A variety of different float glasses and plastics may be used. Exemplary plastics that may be used include transparent acrylic plastics supplied by Evonik under the name Acrylite®. The term "translucent" is meant to indicate that substrate 52 is capable of transmitting the light wavelengths (including non-visible light such as UV light) necessary to solidify the solidifiable material and that the intensity of such wavelengths is not significantly altered as the light passes through substrate 52. In the case of photopolymers, a photoinitiator is commonly provided to start the polymerization/cross-linking process. Photoinitiators will have an absorption spectrum based on their concentration in the photopolymer. That spectrum corresponds to the wavelengths that must pass through solidification substrate 52 and which must be absorbed by the photoinitiator to initiate solidification. In one example wherein linear solidification device supplies blue laser diode solidification energy, Irgacure 819 and Irgacure 714 photoinitiators may preferably be used.

As solidification energy is supplied to it, the exposed surface of the solidifiable material will solidify in accordance with a generally—and preferably substantially—linear pattern along the scanning (y) axis, creating a thin linear region of material that adheres to solidification substrate 52. As indicated previously, of the build platform 44, 70 can cause the object 59 to break or distort if it remains adhered to solidification substrate 52. In certain examples, the surface of rigid or semi-rigid solidification substrate 52 which contacts the solidifiable material is coated with a material 55 (FIG. 1A) used to reduce the adhesion of solidified material to substrate 52. Suitable adhesion reducing agents include Teflon® coatings. Non-stick coatings such as nanocoatings may also be used.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids. In one embodiment of a photopolymer paste solidifiable material, a viscosity of between 10000 cP (centipoises) and 150000 cp is preferred.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis(eta 5-2,4-cyclopenadien-1-yl)Bis[2,6-difluoro-3-(1H-pyrrol-1-yl)phenyl]titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl)phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The linear solidification device 42 may be configured in a number of ways. In certain examples, the linear solidification device 42 progressively exposes portions of the solidifiable material 50 to solidification energy along one axis (a scanning axis) as the linear solidification device 42 moves along another axis (a travel axis). The solidification energy may comprise electromagnetic radiation. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

As indicated previously, the methods described herein use contourless object data to generate solidification energy source event data used in linear solidification processes. A contrasting technique utilizing contour data will be explained with reference to FIGS. 2A-2D. In FIG. 2A an image of a model of an object 78 is depicted. The object is in the shape of a pyramid with four triangular sides and a square base. The object 78 may be represented using three-dimensional object data comprising a plurality of object data items, such as STL triangles or other polygonal object data items. In techniques that use contour data, a slicing operation is performed by mathematically determining the intersections between a plurality of planes parallel to a defined axis (the z-axis in the figures) and the object model 78. The result of this process is a number of data slices which are graphically illustrated as slices 82 in FIG. 2B. The slicing process yields a number of two-dimensional data sets from a three-dimensional object representation. The loci of points defined by the intersection of the outer surface of the object model and each slicing plane comprises a closed polygon, one example of which is shown in FIG. 2C. The slice in 2C comprises four lines that define the shape of a square and which comprise contour data 84. Thus, the process of contour data generation involves calculating the coordinates of the lines that define the two-dimensional, closed polygon contours resulting from a slicing process.

Figure 2B:
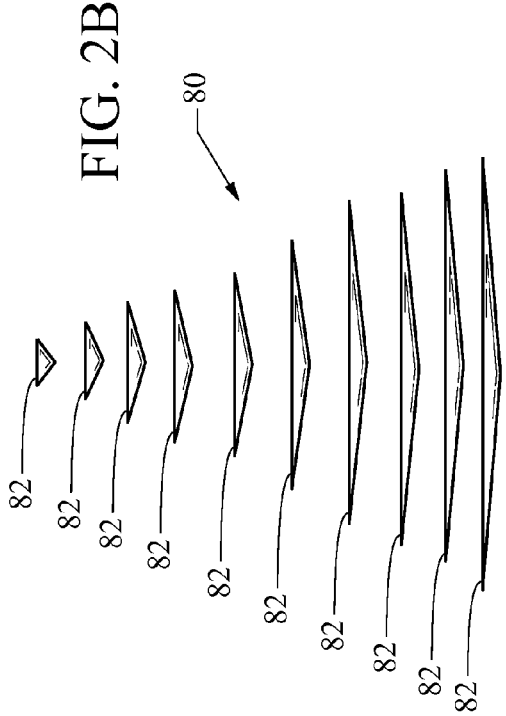
FIG. 2B is a depiction of a plurality of slices of the object of FIG. 2A created by slicing the object of FIG. 2A with a plurality of parallel slicing planes.
Figure 2D:
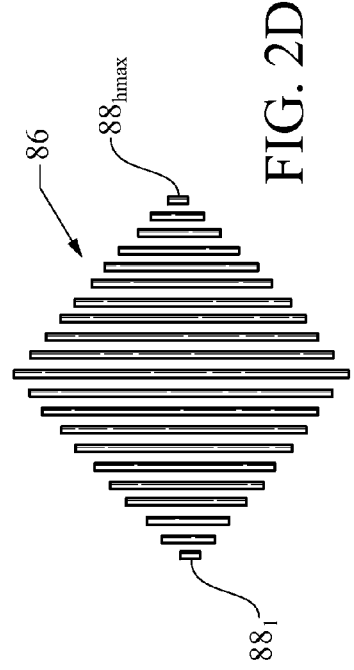
FIG. 2D is a graphical depiction of linear strip data generated from the contour data of FIG. 2C used to illustrate the generation of solidification energy source event data.
Figure 2A:
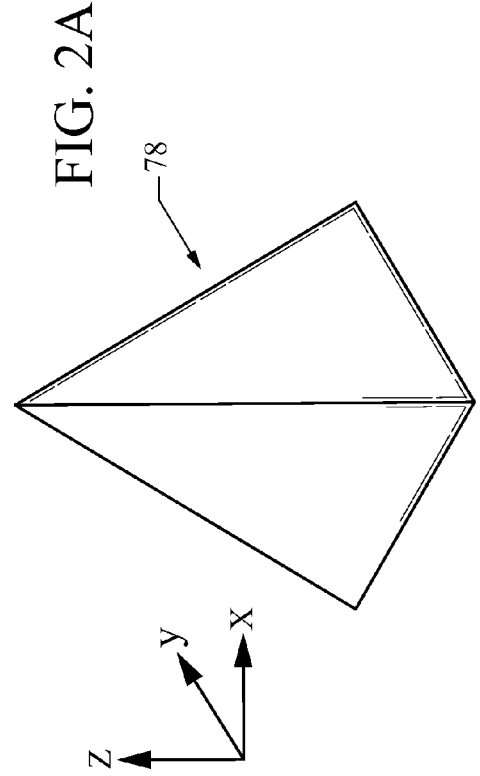
FIG. 2A is an image of a model of a three-dimensional object defined by three-dimensional object data.
Figure 2C:
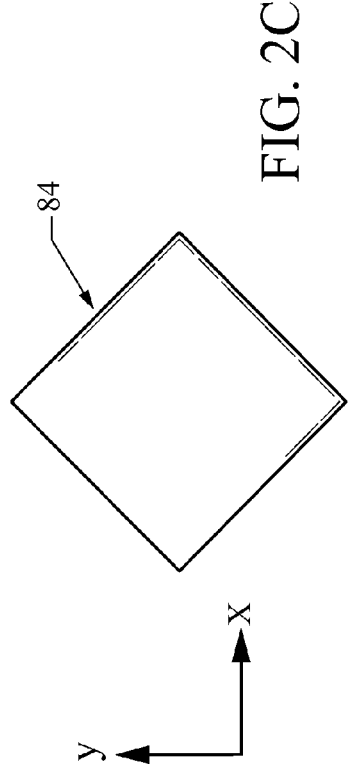
FIG. 2C is a graphical depiction of contour data for one of the slices shown in FIG. 2B.

To obtain solidification energy source event data, each set of contour data 84 is then subdivided into a plurality 86 of adjacent linear strips $88_1$ to $88_{max}$ as shown in FIG. 2D. Each strip has a length corresponding to the length of a scanning (y) axis along which a linear solidification device such as devices 42 selectively projects solidification energy. Each strip $88_1$ to $88_{max}$ defines scanning (y) axis locations at which the energization state of the linear solidification device 42 changes. In the specific example of FIG. 2D, the particular object layer is defined by a series of continuous adjacent strips of varying lengths. One end of each strip represents a scanning (y) axis location at which solidification begins for a particular travel (x) axis location, and the other end of each strip represents a scanning axis location at which solidification ends for particular travel (x) axis location. These locations can, in some systems, be converted to time values that dictate when a solidification energy source is activated or deactivated as described in paragraphs 164-181 and FIGS. 16(c)-16(g) of U.S. patent application Ser. No. 13/534,638. An example of the resulting string data is depicted in FIGS. 16(d), 16(f), and 16(g) of U.S. patent application Ser. No. 13/534,638. The string data includes a plurality of data strings, each of which includes solidification energy source event data in the form of consecutive time values. Each time value corresponds to a change of the energization state of a linear solidification device. Thus, in the example of FIG. 2D, each strip corresponds to two time values, a first time at which a solidification energy source is activated, and a second at which the solidification energy source is deactivated. In contrast to the method illustrated by FIGS. 2A-2D, the methods of the present disclosure do not generate contour data such as that illustrated in FIG. 2D. Nor do they perform the slicing operation illustrated in FIG. 2B.

Figure 4A:
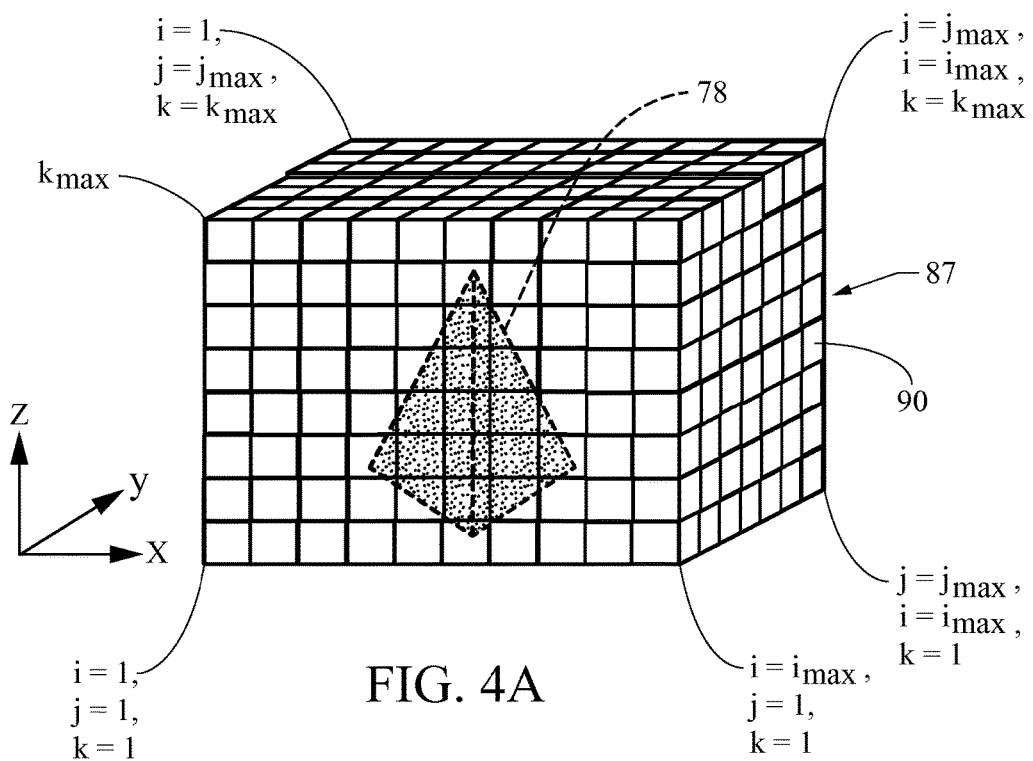
FIG. 4A is a graphical depiction of a voxel matrix superimposed over a model of a three-dimensional object defined by three-dimensional object data.
Figure 4B:
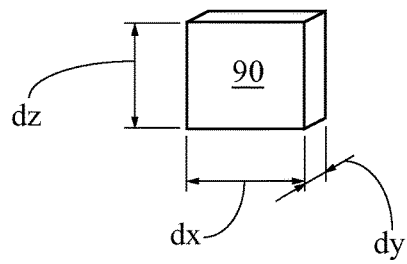
FIG. 4B is a graphical depiction of a voxel from the voxel matrix of FIG. 4B.

Referring to FIG. 4A a voxel matrix 87 is shown and is defined relative to a reference coordinate system with x, y, and z axes. The voxel matrix 87 comprises a plurality of three-dimensional volumetric pixels 90 ("voxels" for short). Each voxel 90 has indices i, j, and k, which respectively define its location within the voxel matrix 87 and along the x, y, and z axes. In addition, each voxel 90 has a length dx along the x-axis, a width dy along the y-axis, and a height dz along the z-axis, as shown in FIG. 4B. The voxels collectively define a cube structure with $i_{max}$ voxels along the x-axis, $j_{max}$ voxels along the y-axis and $k_{max}$ voxels along the z-axis. The index value $i_{max}$ is the maximum x-axis index value, the index value $j_{max}$ is the maximum y-axis index value, and the index value $k_{max}$ is the maximum z-axis index value. Although the voxel is illustrated graphically, in preferred examples, it is defined via mathematical equations when used to generate voxel data.

In FIG. 4A an image of a model three-dimensional object 78 is shown placed on the same reference coordinate system as the voxel matrix 87, thereby superimposing the voxel matrix over the object model 78. In certain preferred examples, the model of the three-dimensional object is defined by three-dimensional object data comprising a plurality of three-dimensional object data items of the type described previously. The superimposition of the voxel matrix over the object model 78 is preferably carried out using mathematical equations but is depicted graphically in FIG. 4A for ease of understanding. The superimposition process yields voxel data representative of the three-dimensional object. The voxel data comprises sets of active voxels that are defined by their whole or partial intersection with the object model 78. The voxel data is then used to generate solidification energy source event data that determines the pattern of solidification energy supplied by linear solidification device 42 along the scanning (y) axis as it moves along the travel (x) axis.

Figure 4C:
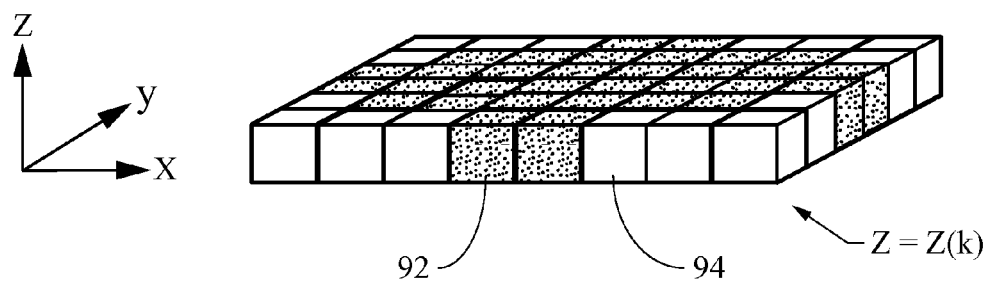
FIG. 4C is a graphical perspective view of active voxels defined by the intersection of the object model of FIG. 4A and the voxels at a particular z-axis location in the voxel matrix of FIG. 4A.
Figure 4D:
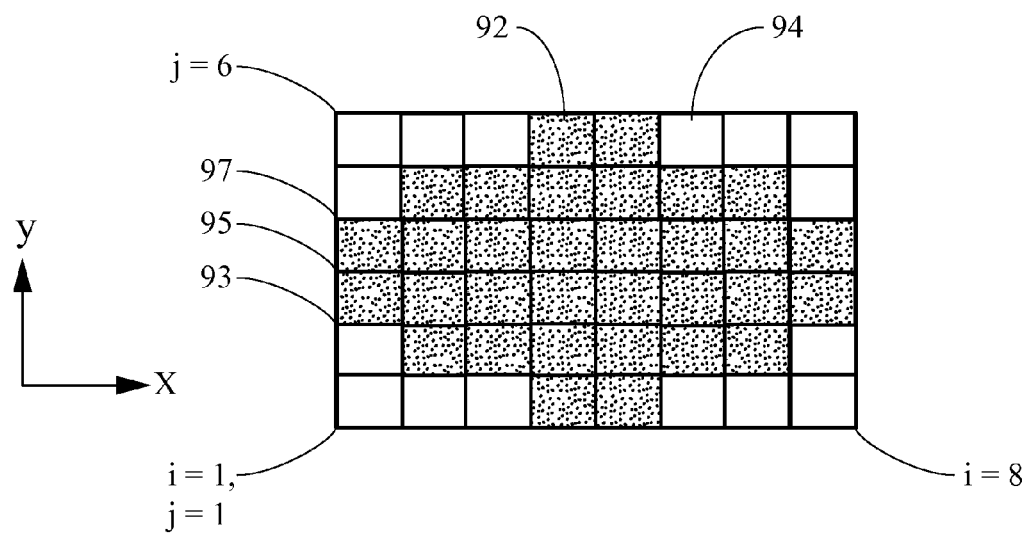
FIG. 4D is a top plan view of the voxels of FIG. 4C.

FIGS. 4C and 4D illustrate the intersection of active voxels at a particular z-axis location (z(k)) with the object model 78. In the illustrated example, there are 8 voxels (i=1 to 8) along the x-axis, and 6 voxels (j=1 to 6) along the y-axis. FIG. 4C is a perspective view showing the active voxels 92 (in black) that intersect the voxel matrix 87 at z=z(k) as well as the inactive voxels 94 at z=z(k). In the illustrated example, the active voxels 92 are those voxels having any portion of their interior volume occupied by the object model 78. In other examples, other techniques may be used to define the active voxels. For example, a threshold percentage of the voxel volume occupied by the object model 78 may be set such that the active voxels are those exceeding the threshold percentage. In accordance with the example of FIGS. 4C and 4D, in certain embodiments, each voxel 90 in voxel matrix 87 may be evaluated to see if any portion of its interior volume intersects object model 78. This process yields a set of active voxels, each having defined x, y, and z coordinates and corresponding index values, i, j, and k. The active voxels may then be used to define solidification energy source event data. For example, referring to FIG. 4D there are two active voxels at x-axis index i−1, having scanning axis index values of 3 and 4. The voxel at j=3 defines a location at which solidification energy is first supplied to the solidifiable material. The voxel at j=4 defines a location at which the supply of solidification energy is discontinued (so that no solidification occurs at j=5). These scanning axis locations for j=3 and j=4 may then define corresponding solidification energy source event data values. In one example, they each define time values with the time value for j=3 defining the time at which solidification energy is first supplied to the solidifiable material and the time value for j=4 defining the time at which solidification energy is discontinued.

It is useful to use the term "build envelope" to describe the maximum distance along the travel (x) axis and the maximum distance along the scanning (y) axis in which solidification energy may be supplied to the solidifiable material. The scanning (y) axis length of the build envelope will be limited by the maximum length of solidification energy that can be provided by linear solidification device 42 along the scanning (y) axis, but may be smaller than that length as dictated by the build platform 44, 70 dimensions, the dimensions of the solidifiable material container 48, 65 or other considerations. The travel (x) axis length of the build envelope will be limited by the maximum distance of travel of linear solidification device 42, but may also be limited by similar considerations.

Figure 5A:
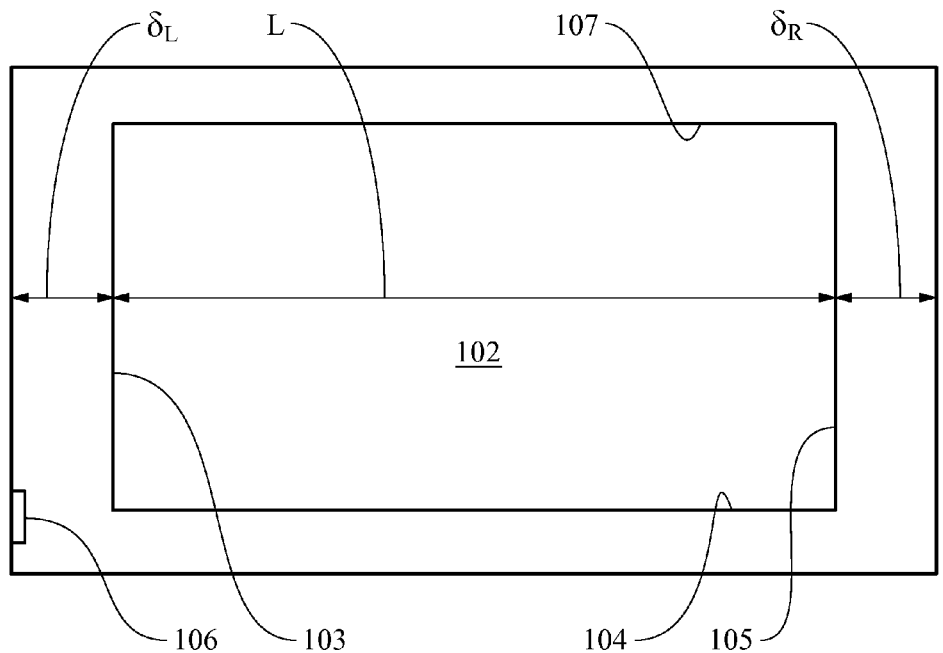
FIG. 5A is an exemplary top plan view of a build envelope of an apparatus for making a three-dimensional object.
Figure 5B:
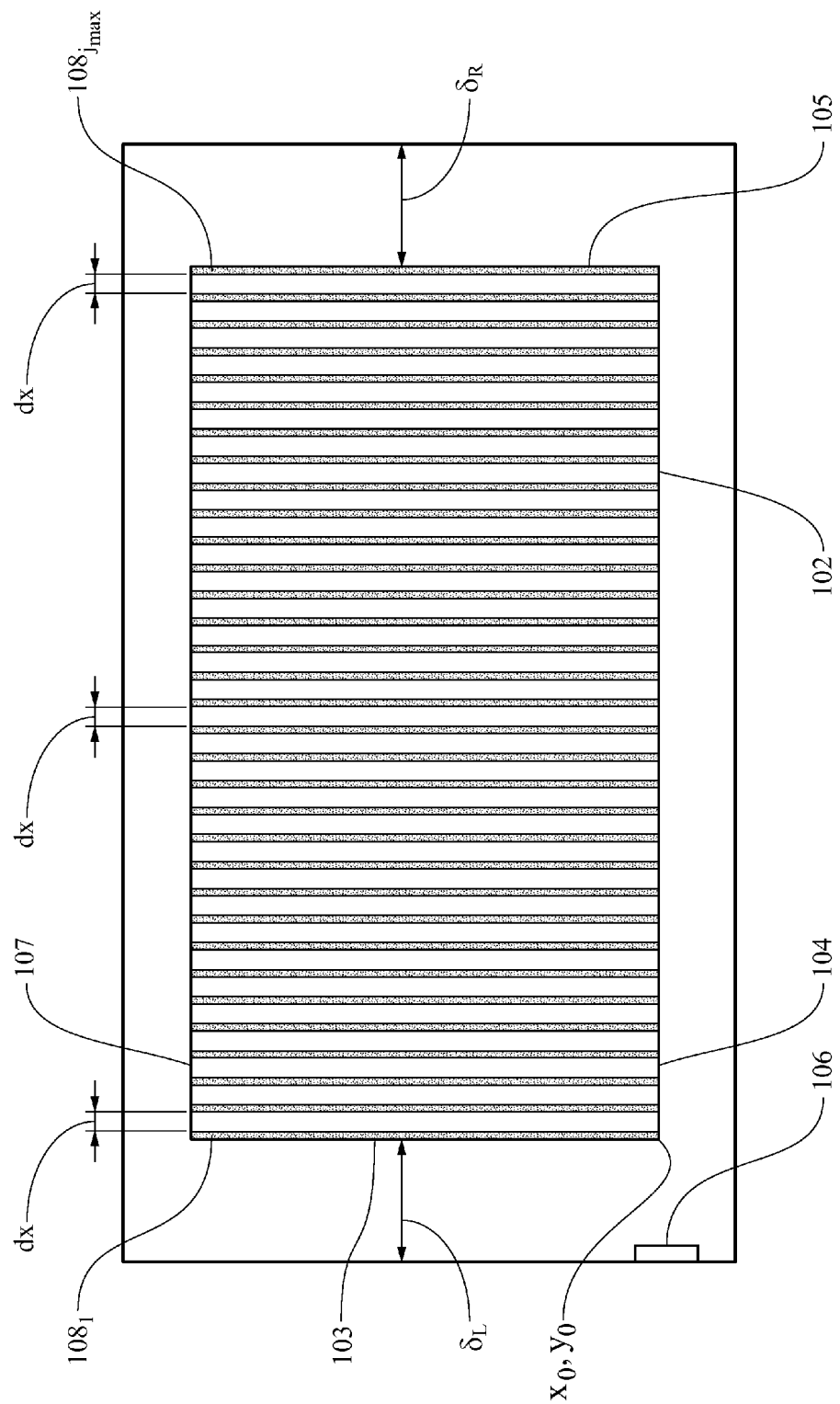
FIG. 5B is an exemplary top plan view of the build envelope of FIG. 5A with the maximum scan lines of a linear solidification device superimposed thereon to illustrate the scan line gap dx of the linear solidification device.

FIGS. 5A and 5B depict a top view of a region of solidifiable material which includes a build envelope 102. The build envelope defines the maximum area of solidification, and therefore, the maximum area of the three-dimensional object in the x-y plane. As shown in FIGS. 5A and 5B, in certain cases the linear solidification device 42 is movable along the travel (x) axis along a total distance that equals the sum of a build envelope 102 travel (x) axis length L and two offset distances, $\delta_L$ and $\delta_R$. The offset distances $\delta_L$ and $\delta_R$ respectively represent the distance from the left end-of-travel (EOT) position of linear solidification device 42 to the left-hand side build envelope boundary 103 and the distance from the right-hand side EOT position to the right-hand side build envelope boundary 105. In certain examples, the offset distances, $\delta_L$ and $\delta_R$ are provided to ensure that the linear solidification device 42 has time to achieve a substantially constant speed in the travel (x) axis direction before any solidification of solidifiable material will begin (i.e., before build envelope 102 is reached). In certain examples, the movement of the linear solidification device 42 at a constant travel (x) axis speed avoids the necessity of directly measuring the travel (x) axis position at any given moment because it allows a motor movement parameter for a linear solidification device travel axis translation motor (not shown) to provide an indirect indication of x-axis position. In one particular example suitable for servo and stepper motors, the motor movement parameter is a number of motor steps. In certain examples, $\delta_L$ and $\delta_R$ are equal. Travel (x) axis end of travel sensor 106 may also be provided to generate a signal indicating the linear solidification device 42 has reached an end-of-travel position along the travel (x) axis.

In certain illustrative examples, the active voxels at each build (z) axis location (k=1 to $k_{max}$) correspond to scan lines 108 along which the linear solidification device 42 may selectively provide solidification energy within build envelope 102. Examples of such scan lines 108 are shown mapped onto build envelope 102 in FIG. 5B. Each scan line 108 may be assigned a scan line index ranging in value from 1 to $n_{max}$. The maximum length of each scan line 108 is defined by the distance between the build envelope scanning axis borders 104 and 107. The scan lines are arranged adjacent to one another starting at a build envelope travel axis border 103 and ending at build envelope travel axis border 105.

Figure 6:
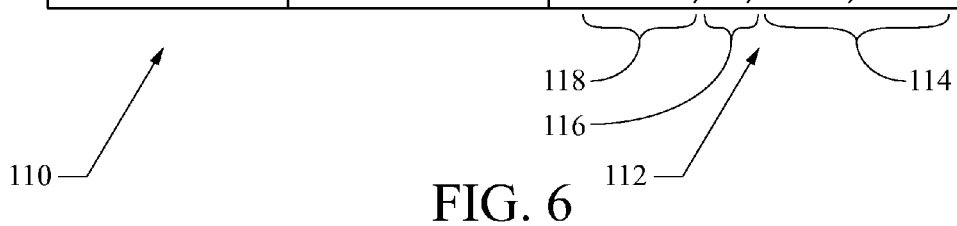
FIG. 6 is an data table used to illustrate solidification energy source event data comprising a plurality of time values at which the energization state of a solidification energy source changes for a plurality of scan lines.

During a solidification operation for any given layer of a three-dimensional object, solidification energy will not necessarily be supplied along all scan lines 108 or along the full length of any particular scan line 108. The particular scan lines 108 and portions thereof during which scanning will occur will be dictated by solidification energy source event data. FIG. 6 provides a table that illustrates an example of solidification energy source event data in the form of CPU tick values that are provided in data strings. Each data string may be assigned a string index value (n=1 to $n_{max}$) that uniquely corresponds to one of the scan lines 108 in the build envelope 102. In certain examples, the string index value is the same as the scan line index value. The string indices begin with n=1 at the left-hand border 103 of build envelope 102 and end at a maximum string number $N_{max}$ at the right hand border 105 of the build envelope 102.

Certain sets of data strings will not have any object data associated with them because they do not correspond to travel (x) locations where solidification where occur. In accordance with the data in FIG. 6 (and based on the voxel data in FIG. 5B), no solidification occurs prior to string index n=20 and no solidification occurs after the string index n+7. Thus, there are no entries in the table of FIG. 6 for the travel (x) axis locations at which no solidification occurs within build envelope 102. In certain implementations, it is convenient to reduce the amount of computer memory required to store string data by defining a computer memory index m 110 which is used to uniquely identify only those data strings that include solidification energy source event data (i.e., only those data strings for locations along the travel (x) axis where solidification will actually occur).

Each set of data strings depicted in FIG. 6 has a start code which is represented in hexadecimal notation by a series of eight Fs. Going from left to right, the string index n for the data string is next. Following the string index, a series of solidification time values is provided. Each solidification time value defines the occurrence of a solidification energy source energization event. In one example, the energization states are ON or OFF. The solidification time values may take a variety of forms. However, in one implementation they are defined as elapsed times of a CPU clock in microcontroller unit used to operate the system for making a three-dimensional object. In one example, the CPU has a clock speed of 66 MHz and the units of time are CPU ticks. In an example where the line scanning speed is 1000 lines per second, the maximum scan length of each line in the scanning axis (y-axis direction) corresponds to 66,000 ticks. Thus, the data string at n=20 indicates that solidification energy will be supplied to the solidifiable material at 31000 ticks and discontinued at 44000 ticks. The data string at n=21 indicates that solidification energy will be supplied to the solidifiable material at 30000 ticks and discontinued at 34000 ticks. In a preferred embodiment a timer is provided (such as a software timer programmed into the microcontroller unit) which is reset at the beginning of each linear scan, and the beginning of each linear scan is synchronized to the build envelope scanning axis boundary 104. Thus, the ticks are defined relative to a zero starting time when the timer is reset at which point the line scanning operation is at the scanning axis boundary 104 (FIG. 6). Alternatively, the ticks may be defined relative to a zero starting time at which point the line scanning operation is at a path generation reference frame border 201 as discussed below with respect to FIGS. 13-15)

In certain examples, the systems 40 and 43 for making a three-dimensional object from a solidifiable material may include a non-transitory computer readable medium (i.e., a hard disk drive or a removable non-transitory medium such as a DVD) having computer executable instructions stored on it. The systems 40 and 43 may also include one or more processors and one or more microcontrollers. The one or more microcontrollers are configured to receive instructions from the one or more processors and to selectively activate and deactivate a source of solidification energy to cause the linear solidification device to selectively supply solidification energy along the scanning (y) axis in accordance with solidification energy source event data. When executed by one of the processors, the computer executable instructions generate voxel data from the three-dimensional object data. In preferred examples, the computer executable instructions further generate solidification energy source event data from the voxel data.

Figure 7A:
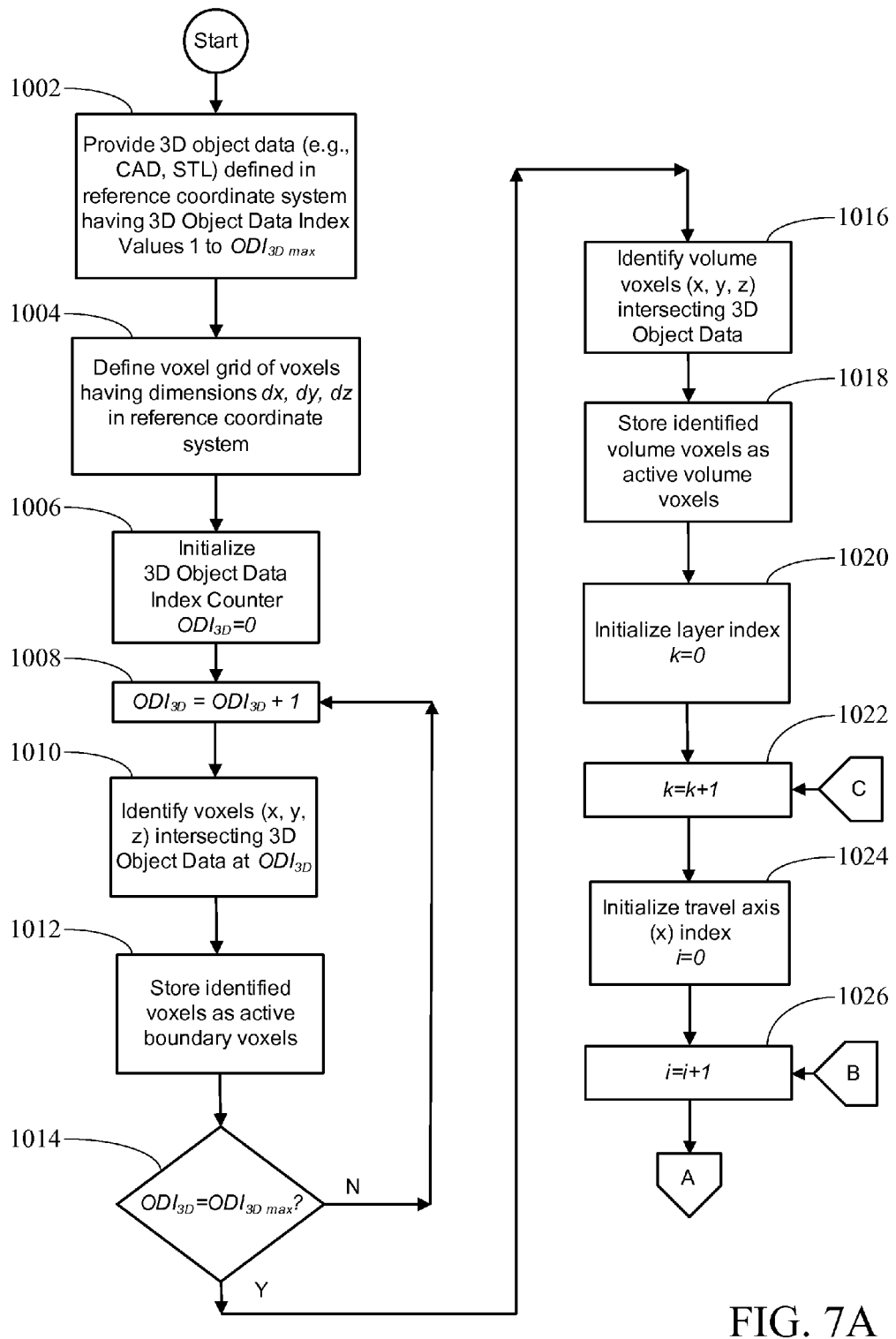
FIGS. 7A and 7B are a flow chart depicting a method of generating solidification energy source event data from three-dimensional object data.
Figure 7B:
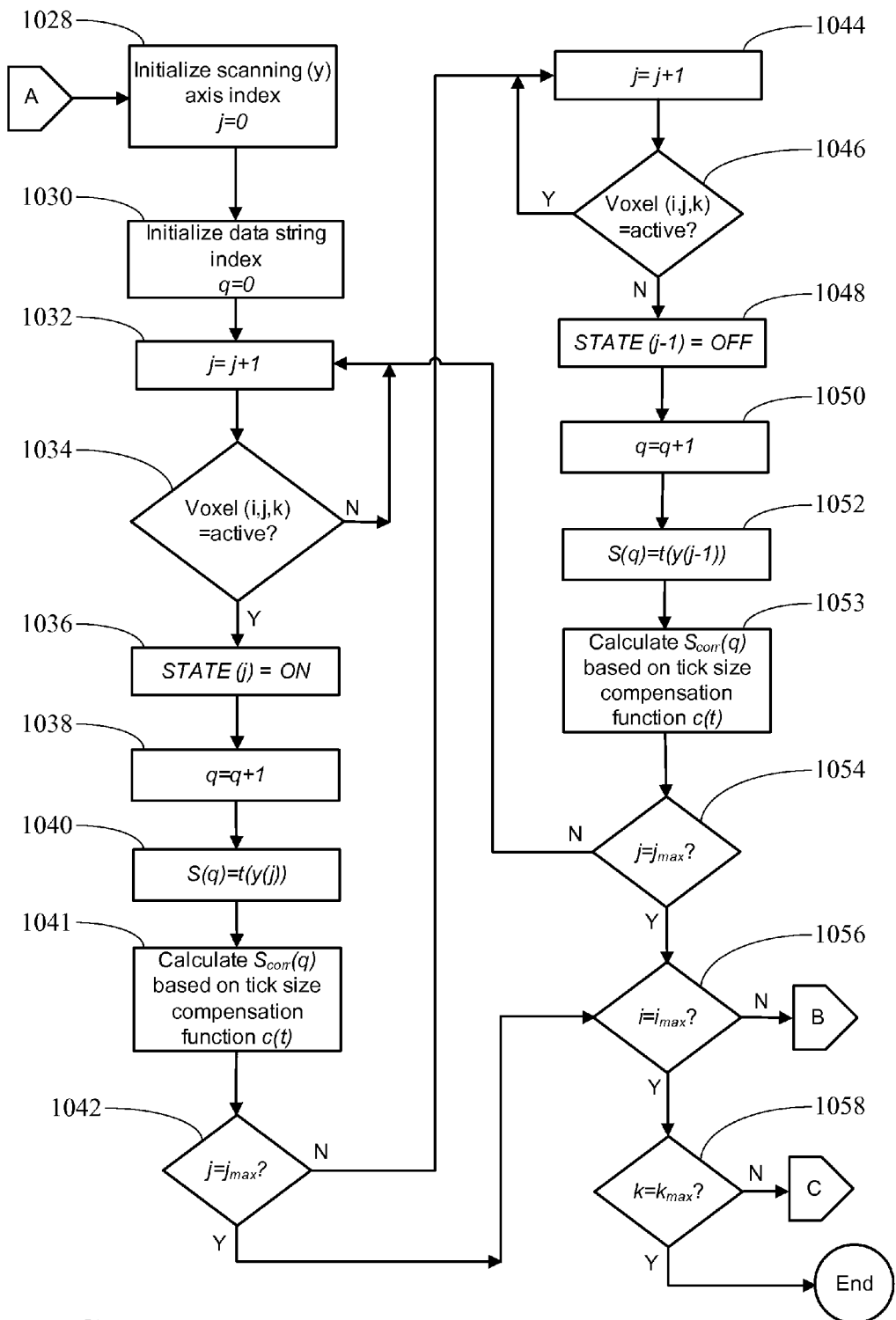

Referring to FIGS. 7A and 7B, an exemplary embodiment of a method for making a three-dimensional object using linear solidification and contourless object data will now be described. The method begins with the receipt of three-dimensional object data in step 1002. The three-dimensional object data is defined with respect to a reference coordinate system and comprises three-dimensional object data items having object data index values (ODI) ranging from 1 to a maximum value ($ODI_{3DMAX}$). For example, if the object data comprises STL data, the object data items may comprise a plurality of triangles, each of which is assigned a unique index value ranging from 1 to $ODI_{3DMAX}$.

In step 1004, a three-dimensional voxel matrix is defined. The voxel matrix comprises a grid of voxels in three-dimensions. In a preferred example, each voxel has a dimension dx along the x-axis, a dimension dy along the y-axis, and a dimension dz along the z-axis.

In certain implementations of the method of FIGS. 7A and 7B, at least one of the dimensions dx, dy, and dz is determined by a physical dimension of an apparatus for making a three-dimensional object, for example, the exemplary systems 40 and 43 of FIGS. 1A and 1B. In other implementations, at least two of the dimensions dx, dy, and dz are determined by a physical dimension of an apparatus for making a three-dimensional object, and in still other implementations, all three dimensions dx, dy, and dz are determined by physical dimensions of an apparatus for making three-dimensional objects. In one case, the dimension dx is equal to the scan line gap between adjacent scan lines $108_1$ to $108_{nmax}$ in FIG. 5B. Exemplary methods of determining a scan line gap are provided below. However, in certain examples, the scan line gap is determined by the speed I), at which the linear solidification device 42 travels along the travel axis and the number of scan lines per unit time the linear solidification device 42 is capable of generating:

$$\Delta SL = v_x / SL_f \quad (1)$$

wherein,
$\Delta SL$=scan line gap (mm)
$v_x$=travel axis speed of linear solidification device (mm/sec)
$SL_f$=scan line frequency (no. scan lines/sec)

The foregoing equation neglects the width of the scan lines along the travel (x) axis. However, if the width is known, equation (1) can be modified as follows:

$$\Delta SL = [v_x/SL_f][1 - SL_w(SL_f/V_x)] \quad (2)$$

wherein,
$\Delta SL$=scan line gap (mm)
$v_x$=travel axis speed of linear solidification device (mm/sec);
$SL_f$=scan line frequency (no. scan lines/sec); and
$SL_w$=width of each scan line along travel (x) axis (mm).

In certain illustrative examples, the voxel dimension dy is equal to or based on the minimum feature resolution along the scanning axis. A given controller and linear solidification device will generally have hardware and/or software limitations that define the smallest solidifiable feature size along the scanning (y) axis, and in certain examples, this voxel dimension dy is assigned a value equal to this smallest solidifiable feature size. In one example, dy is chosen based on the machine resolution, the impact of dy on performance, and the minimum feature resolution along the scanning (y) axis. In one example, an apparatus is provided which has a desired scanning axis resolution of 50 µm and a scan length/CPU tick of 4 µm. Thus, dy will be less than or equal to 50 µm. The timer or clock on which the string data is based will necessarily set a lower (theoretical) limit of the time required to toggle the solidification energy source from ON to OFF or vice-versa (i.e., if CPU ticks are used, one (1) CPU tick will theoretically be the minimum possible toggle time). However, the solidification energy source will itself constrain the minimum toggle time, and this example, the toggle time is four (4) CPU ticks. As a result, the length of solidification along the scanning (y) axis which corresponds to the minimum toggle time is 4 CPU ticks×4 µm/CPU tick=16 µm. Thus, 16 µm is the minimum machine resolution that is achievable along the scanning (y) axis, and dy will be greater than or equal to 16 µm. As dy decreases, the time to process the object data increases because the voxel matrix density increases. A value of dy=25 µm is chosen, which is lower than the value of dy corresponding to the desired scanning axis resolution and greater than the value of dy corresponding to the length of solidification/minimum toggle time. Experimental test parts for the exemplary apparatus are built by varying dy between 16 µm and 50 µm and indicate that 25 µm achieves a satisfactory compromise between voxel matrix processing time and object quality.

In the same or other illustrative examples, the voxel dimension dz is assigned the value of the layer thickness used in the process of manufacturing a three-dimensional object. In certain systems, the layer thickness is dictated by a movement parameter in a controller used to control the movement of the build platform on which the object is built, such as build platforms 44 and 70 in FIGS. 1A and 1B. For example, in FIG. 1A, the linear solidification device 42 traverses the build envelope 102 along the travel (x) axis once to solidify a single layer of solidifiable material 50. During a layer solidification operation (i.e., when the linear solidification device 42 is traversing the build envelope 102 along the travel (x) axis and selectively supplying solidification energy along the scanning (y) axis), the position of build platform 44 along the build (z) axis remains fixed.

Once the traversal is complete, the build platform 44 is elevated along the build (z) axis to separate the last solidified object section from the bottom of solidifiable material container 48, with the bottom being defined by the film 55 on the solidification substrate 52. The distance by which the build platform is elevated dictates the build axis thickness of the solidifiable material that will flow into and fill the gap between the exposed lower surface 64 of the object 59 and the film 55 on the solidification substrate 52 and dictates the layer thickness. Thus, in certain examples, the voxel matrix dimension dz is assigned this layer thickness value. Correspondingly, in the system of FIG. 1B, following the solidification of each layer of solidifiable material 50, the build platform 70 will move downward by an amount equal to the layer thickness, and dz will be assigned this layer thickness value. In one preferred example, the dimension dx of each voxel 90 is assigned the value of the scan line gap ΔSL, the dimension dy of each voxel 90 is assigned the value of the minimum feature resolution along the scanning (y) axis, and the dimension dy is assigned the layer thickness value.

Referring again to FIG. 7A, in step 1006 a three-dimensional object data index counter ($ODI_{3D}$) is initialized, e.g., to a value of zero. The object data index counter is then incremented in step 1008 to process the first three-dimensional object data item. The voxels that intersect the object data item are then identified in step 1010. Suitable mathematical equations are used to identify those voxels for which any portion of the first object data item exists within the interior volume of the voxels. Because three-dimensional object data is often used to define only the outer surface or "boundary" of the three-dimensional object, the identified voxels that are active for the particular object data item of interest are stored as active boundary voxels in step 1012.

In step 1014, the method determines whether the last item of object data has been reached by comparing the current value of the object data index counter to the maximum value of the counter ($ODI_{3D\ Max}$). If the last item has not been reached, control transfers to step 1008, and the object data index counter value is incremented. The next object data item is then processed in steps 1010-1014 in the manner described previously.

Once the active boundary voxels have been identified and stored (i.e., step 1014 evaluates as "YES" or "TRUE"), control transfers to step 1016. In contrast to boundary voxels, volume voxels are those defined by the interior of the model of the three-dimensional object. Techniques for identifying active volume voxels are known in the art. In general, however, they involve identifying voxels that intersect a portion of the interior of the model that lies within the boundary voxels. In step 1018 the identified active volume voxels are stored.

The steps up until step 1020 can be characterized as describing the voxelization of a three-dimensional object model. The next set of steps describe a method for converting the voxel data from the voxelization process to solidification energy source event data. In accordance with the method, consecutive sequences of active voxels lying in the same scanning (y) axis row are identified, and the consecutive sequences are used to determine solidification energy source event data for a scan index (n) corresponding to the scanning (y) axis row (which is defined by a travel (x) axis index i). The steps that follow describe one exemplary way of converting voxel data to solidification energy source event data.

In step 1020, a layer index k is initialized. The layer index k is incremented in step 1022. In step 1024, a travel axis index i is initialized, and in step 1026, the travel (x) axis index i is incremented. In step 1028, a scanning axis index j is initialized.

In step 1030 a data string index q is initialized. The index q is provided to uniquely identify solidification energy source event data items with in a data string. In the example of FIG. 6, the first data string has a solidification source event data item with a value of 31000 CPU ticks at a data string index value of q=1 and a solidification source event data item with a value of 33000 CPU ticks at a data string index value of q=2.

The scanning axis index j is incremented in step 1032. In step 1034, the method determines whether the voxel at the current value of the layer, travel axis, and scanning axis indices is an active voxel as determined previously in steps 1012 and 1018. If the voxel is active, it is assigned a state of ON in step 1036 to indicate that it will dictate a location along the scanning (y) axis at which solidification energy will be supplied by turning on a solidification energy source in the linear solidification device 42. If the voxel is inactive in step 1034, control returns to step 1032, and the scanning axis index j is incremented by one so the next voxel along the scanning (y) axis can be evaluated.

If the voxel at the current index value of j is active, the data string index q is incremented (step 1038) and in step 1040 a solidification source energy event data item value S(q) is assigned a solidification time value t corresponding to a position along the scanning axis y(j), where j is the current scanning axis index value and is stored. In one example, the solidification time t is expressed in ticks of a CPU clock.

In certain optional examples, the solidification energy source event data may be compensated to account for variations in energy intensity and/or the length of solidification per unit solidification time as a function of scanning (y) axis position or solidification time. In one example, described further below, a compensation function c(t) is provided to calculate a corrected solidification energy source event data item value $S_{corr}(q)$ based on the value of the compensation function c(t) that corresponds to the scanning axis position of S(q) (step 1041).

In step 1042, the method determines whether the maximum scanning index value $j_{max}$ has been reached. If it has not, the scanning (y) axis index is incremented in step 1044, and in step 1046 the method determines if the voxel at the new value of j is active. If the voxel is active, it means that it is within a consecutive sequence of active voxels, and control returns to step 1044 to determine if the subsequent voxel is active. If the voxel is inactive, it means that the sequence of active voxels ended with the previous voxel. Thus, a state of OFF is assigned to the previous voxel (at scanning axis index value j−1), indicating that it will dictate a change in the solidification energy source energization state and a scanning (y) axis location at which the supply of solidification energy will discontinue. In step 1050, the data string index q is incremented, and in step 1052, a solidification energy source event data item S(q) is assigned a time value corresponding to the scanning axis position y(j−1) of the last active voxel in the consecutive sequence. If the maximum scanning axis index value $j_{max}$ has been reached in step 1042, control transfers to step 1056.

Steps 1040 and 1052 can be carried out in a number of ways. As illustrated in FIG. 4B, each voxel has two facets along the scanning (y) axis, and the facets are spaced apart from one another by a distance dy. Each facet corresponds to a specific scanning (y) axis coordinate along build envelope 102 (FIG. 5A) and/or path generation reference frame

Figure 15:
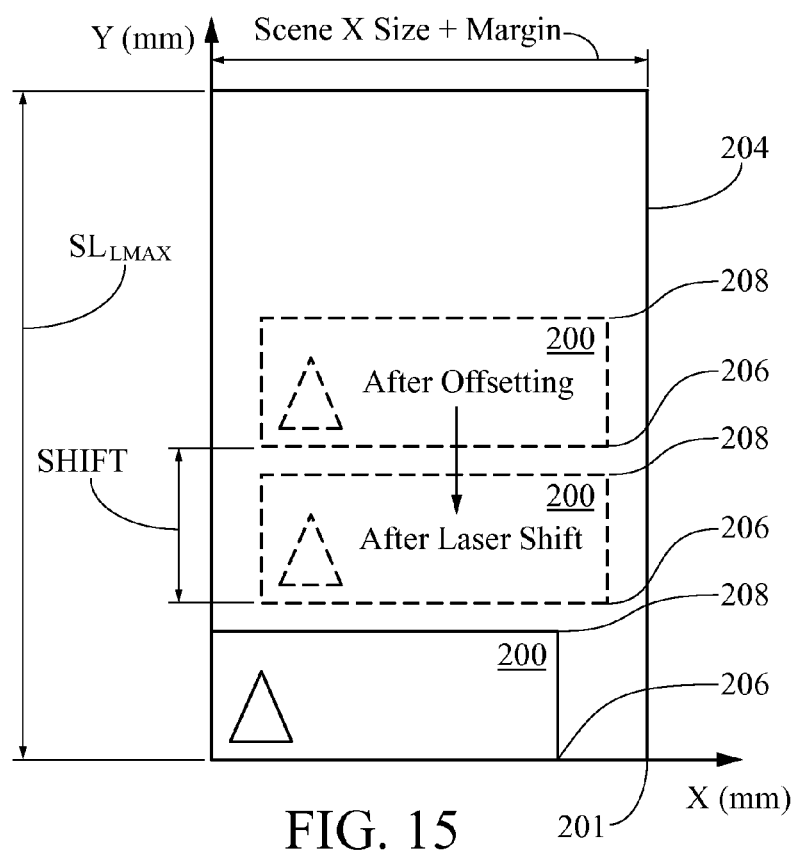
FIG. 15 is an illustration of a path generation reference frame with the virtual build platform of FIG. 14 shown at various positions within the path generation frame to illustrate virtual build platform centering and shifting operations.

204 (FIG. 15, discussed below). In one example, the linear solidification device 42 has a scanning direction along the scanning (y) axis (e.g., the positive y-axis direction or the negative y-axis direction) and moves from a first position to a second position, and this direction is related to the voxel matrix 87 so that one of the scanning (y) axis facets will correspond to a first position along the selected scanning axis direction and the other of the scanning axis facets will correspond to a second position along the selected scanning axis position. The scanning (y) axis coordinate of the facet corresponding to the first position will be used to determine when to activate the solidification energy source in the linear solidification device (and hence when to start supplying solidification energy), and the scanning (y) axis coordinate of the facet corresponding to the second position will be used to determine when to deactivate the solidification energy source. Referring to the row of voxels at i=1 in FIG. 4D, the first active voxel at j=2 has a first scanning axis facet 93 and a second scanning axis facet 95. The second active voxel at j=3 has a first scanning axis facet 95 and a second scanning axis facet 97. In step 1036 the state of voxel 2 would be ON, and the state of voxel 3 would be OFF. The value y(j) in step 1041 would be assigned the y-axis coordinate value of facet 93. The value of y(j−1) in step 1052 would be assigned the y-axis coordinate value of facet 97.

Other techniques for assigning solidification energy source event data item values based on voxel data can also be used. In one technique, the percentage of the volume of a voxel occupied by the model of the three-dimensional object can be used to select a y-axis coordinate between the two scanning axis facets of each active voxel at which solidification energy will be supplied or discontinued.

In certain optional examples, the solidification energy source event data determined in step 1052 is corrected based on a compensation function c(t) as described previously with respect to step 1041. The assignment of solidification energy source event data in step 1052 indicates that the end of a consecutive sequence of active voxels has been reached. Thus, the method continues to look for other consecutive sequences of voxels. In step 1054, the method determines if the last voxel at the current value of i has been reached as indicated by the maximum scanning axis index value $j_{max}$. If the last voxel has been reached, control transfers to step 1056. Otherwise, the value of the scanning axis index j is incremented (step 1032) and the method again seeks to find the first active voxel in a continuous sequence of active voxels in step 1034.

In step 1056, the method determines whether the travel axis index i has reached its maximum value. If it has, control transfers to step 1058. Otherwise, control transfers to step 1026, and the index i is incremented so that the voxels in that row can be evaluated for the presence of continuous sequences of active voxels. If the maximum travel axis index value i has been reached in step 1056, control transfers to step 1058. In step 1058, the method determines if the last build axis row has been evaluated, in which case the value of the build axis index k will have reached its maximum value $k_{max}$. If the last build axis row has been processed, then k will equal $k_{max}$ and the processing of the voxel matrix 87 is complete. Otherwise, control transfers to step 1022, and the build axis index k is incremented to that the next build axis row of voxels can be evaluated.

Thus, the completion of the method of FIGS. 7A and 7B yields sets of solidification source event data for each travel axis index i and each build axis index k of the voxel matrix 87. The sets of string data 112 in FIG. 6 include eight sets of solidification energy source event data 114, each corresponding to one of eight (8) scan lines of a particular layer of a three-dimensional object, wherein the layer that corresponds to a particular build axis index k value. The sets of string data 112 also include scan line indices 116 and a start code 118. The solidification energy source event data 114 is then used by computer executable instructions stored on a non-transitory, computer readable medium to provide instructions to a controller that controls a source of solidification energy in the linear solidification device 42.

Without wishing to be bound by any theory, it is believed that the use of voxelized data, instead of contour or sliced data, to generate solidification energy source event data eliminates or at least reduces the impact of mesh imperfections such as overlapping mesh elements, flipped mesh elements with incorrect orientations because the voxel matrix ensures that any region on the object in three-dimensional space will be defined by only a single element (i.e., a single voxel) which will have a unique state (active or inactive) associated with it. In contrast, contoured data may include artifacts from multiple mesh elements that are intended to define the same location on the object, but which may ultimately produce inaccurate solidification energy source event data that yields an inaccurate three-dimensional object.

A specific example of a portion of the system 43 for making a three-dimensional object of FIG. 1B will now be described with reference to FIGS. 8-11. The system includes a solidification substrate assembly 129 and a linear solidification device 42. In this example, solidification substrate 52 is provided as part of a moving substrate assembly 145 that moves across the solidifiable material along the travel (x) axis as linear solidification device 42 moves along the same axis. In addition, the embodiment of FIGS. 8-11 includes a film assembly 130. Film assembly 130 remains stationary as solidification substrate 52 moves. Film assembly 130 includes a film 178 (not visible in FIG. 8) which is positioned beneath solidification substrate 52 along the build (z) axis. The solidifiable material is located beneath film 178 and solidifies in contact with it. After each layer is solidified, the build platform (not shown in FIG. 8 but shown as 70 in FIG. 1B) drops by the amount of a layer thickness, pulling the adhered film 178 which is then peeled from the solidified object by peeling members 142a and 142b (FIG. 12).

Figure 10A:
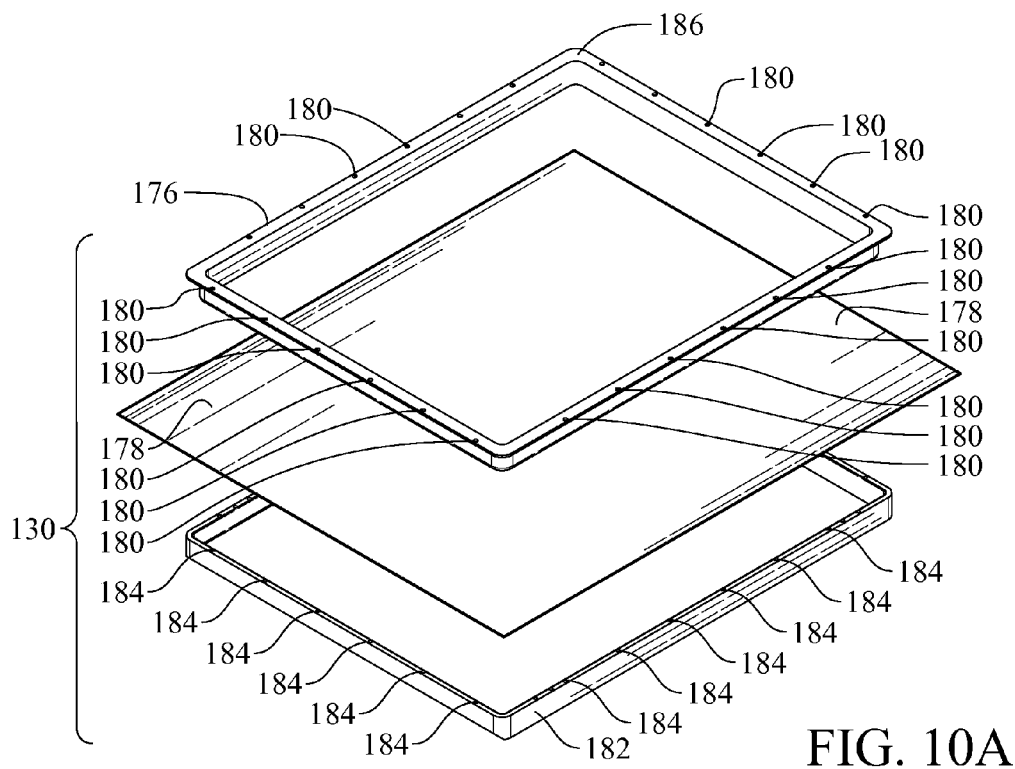
FIG. 10A is an exploded perspective assembly view of a film assembly suitable for use in the apparatus of FIG. 8.
Figure 10B:
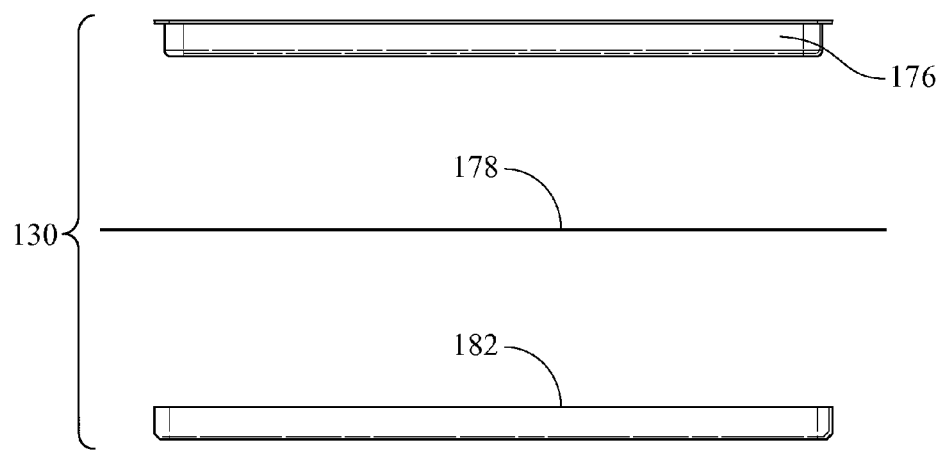
FIG. 10B is an exploded side elevation assembly view of the film assembly of FIG. 10A.
Figure 10C:
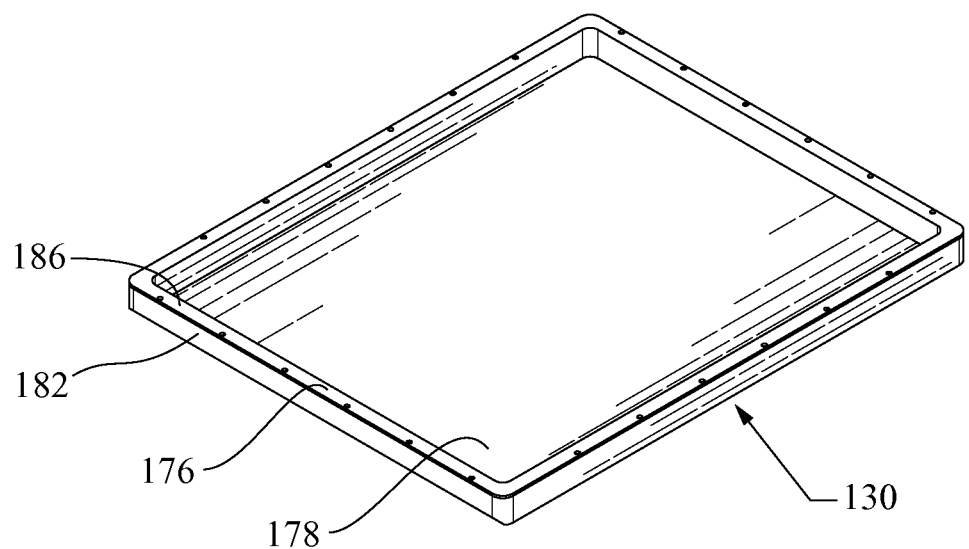
FIG. 10C is a perspective view of the film assembly of FIG. 10 A in an assembled condition.

As best seen in FIGS. 10A-C, film assembly 130 comprises one or more frames, which in the embodiment of FIGS. 10A-10C includes an inner frame 176 and an outer frame 182. Film 178 has a central portion (FIG. 10C) that is disposed in the interior of inner frame 176. Film 178 is preferably stretched tautly and its central portion is positioned underneath rigid or semi-rigid solidification substrate 52. When in use during an object building operation, rigid or semi-rigid solidification substrate 52 applies a downward force on film 178 as substrate 52 moves in the travel (x) axis direction, helping to planarize the exposed surface of the solidifiable material. Fastener openings 180 are provided on inner frame 176 and are alignable with complementary fastener openings 184 on outer frame 182 to secure inner frame 176 to outer frame 182.

Film 178 (as well as the film 55 in FIG. 1A) is preferably a homopolymer or copolymer formed from ethylenically unsaturated, halogenated monomers. Fluoropolymers are preferred. Examples of suitable materials for protective film 178 include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable film 178 materials include PVDF films sold under the Kynar® name by Arkema, ECTFE films sold under the Halar® name by SolvaySolexis, ETFE films sold under the Tefzel® name by DuPont, PFA films sold under the Teflon®-PFA name by DuPont, and MFA films sold under the name Nowofol. MFA and Teflon® films are preferred.

Figure 8:
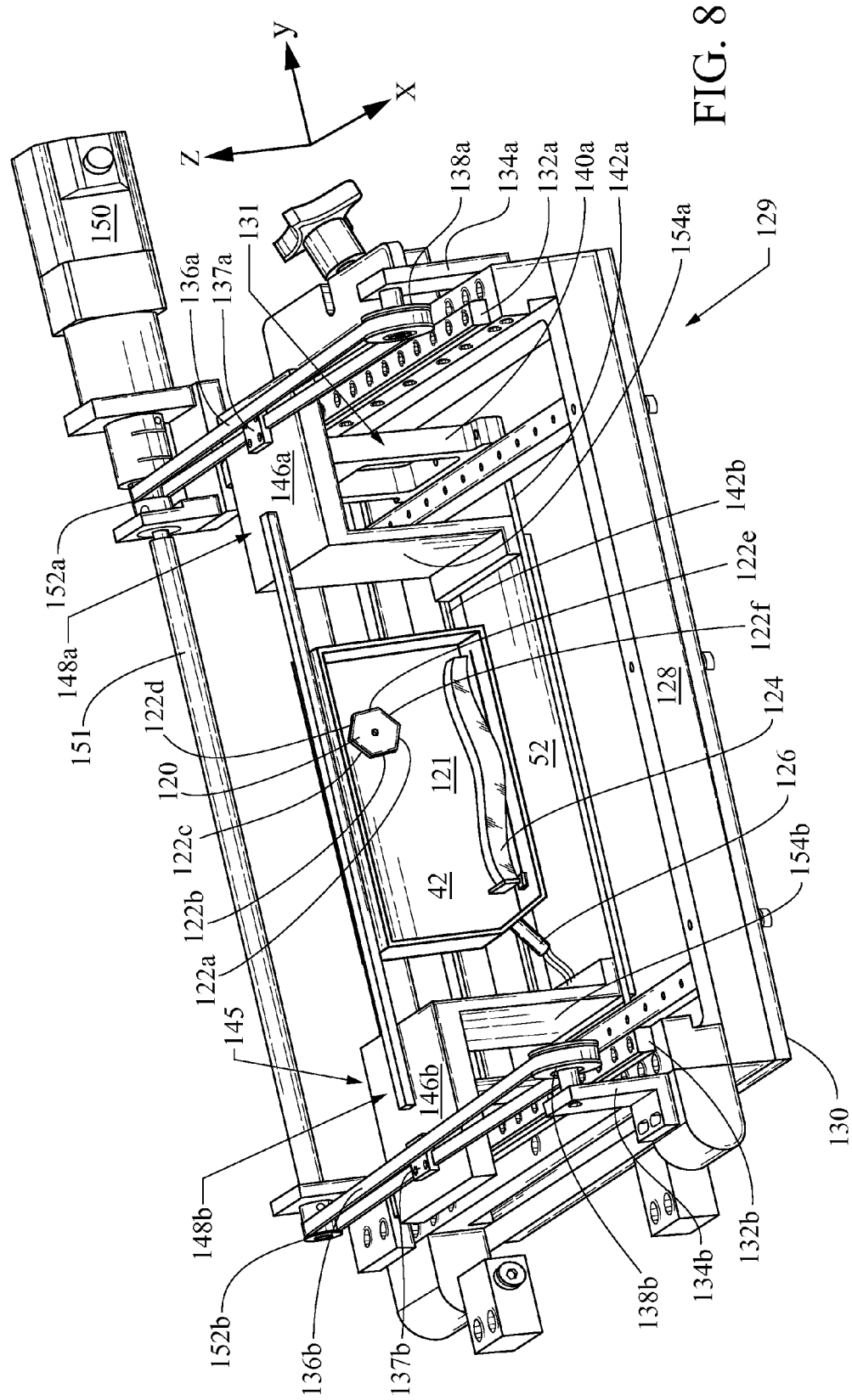
FIG. 8 is a perspective view of a solidification substrate assembly and a linear solidification device for use in a system for making a three-dimensional object using linear solidification and contourless object data.

As best seen in FIG. 8, motor 150 is provided and is operatively connected to linear solidification device 42. However, motor 150 is also operatively connected to solidification substrate 52 such that when motor 150 is energized, shaft 151 rotates about its longitudinal axis causing linear solidification device 42 and solidification substrate 52 to translate along the travel (x) axis.

Figure 11:
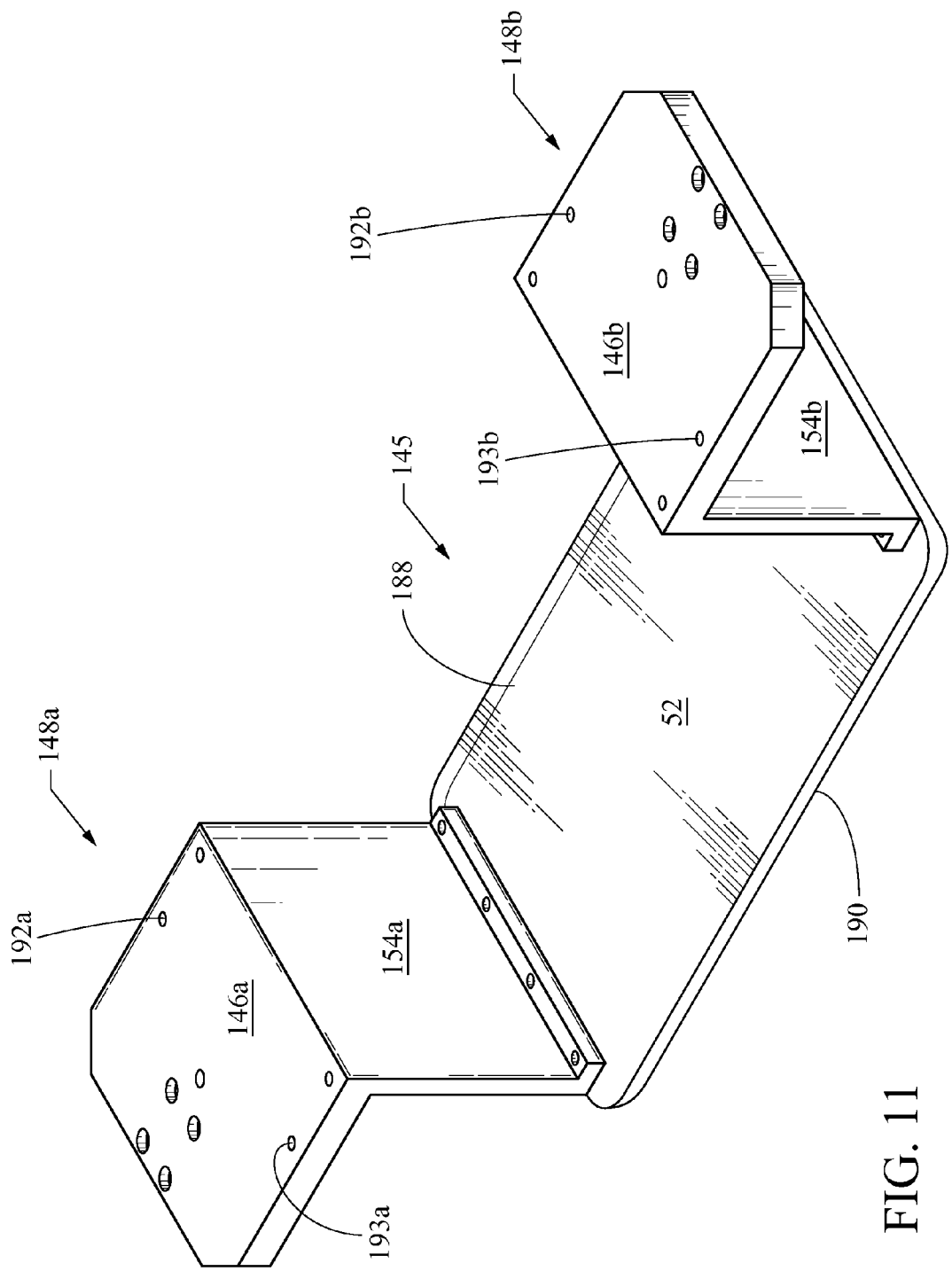
FIG. 11 is a perspective view of a movable substrate assembly used in the solidification substrate assembly of FIG. 8.
Figure 12:
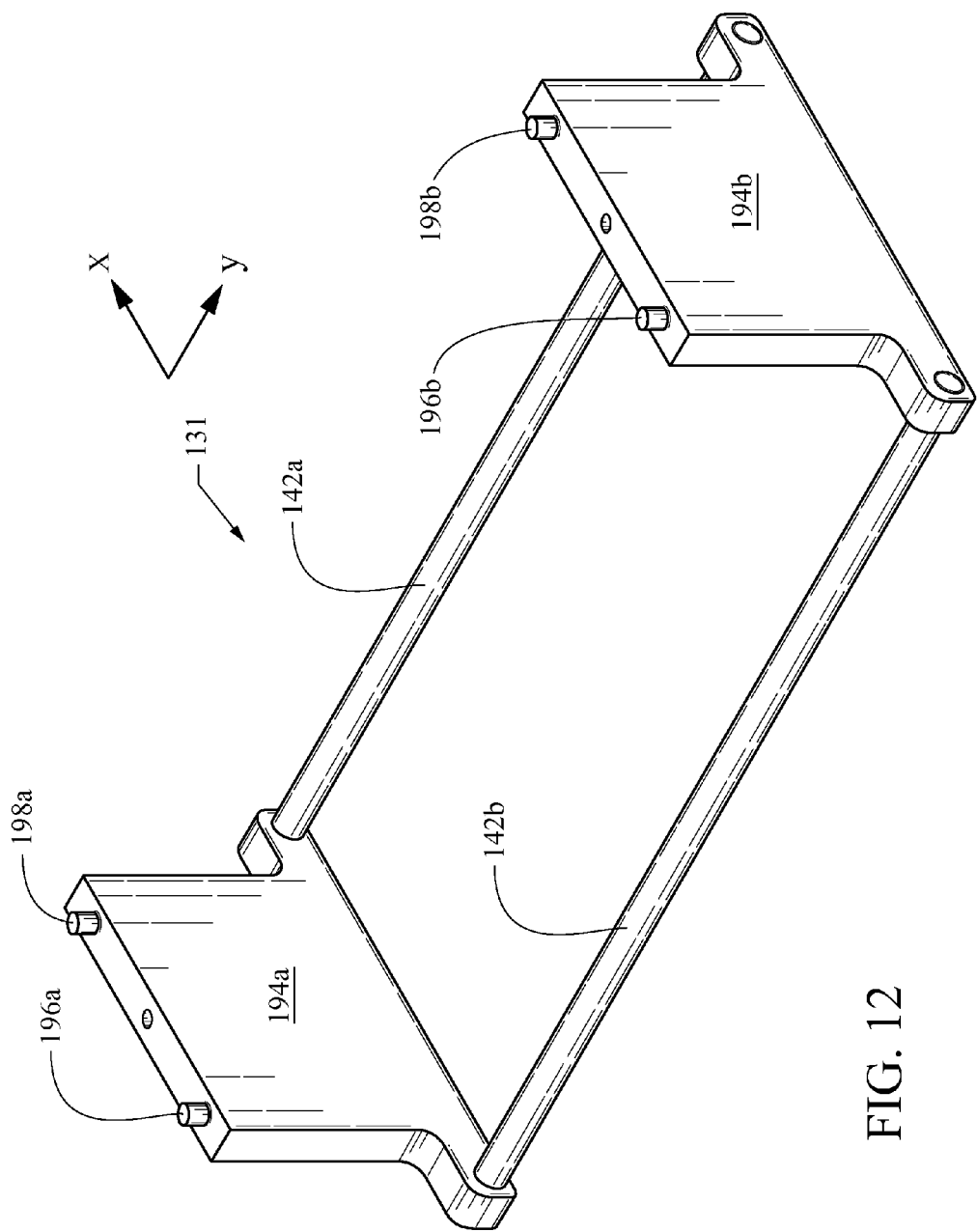
FIG. 12 is a perspective view of a peeling member assembly used in the solidification substrate assembly of FIG. 8.

FIG. 11 is a perspective view of the moving substrate assembly 145 of FIG. 8. A pair of brackets 148*a* and 148*b* connects rigid or semi-rigid solidification substrate 52 to timing belts 136*a* and 136*b*. Brackets 148*a* and 148*b* are spaced apart from one another along the scanning (y) axis. Each bracket 148*a* and 148*b* includes a respective vertical panel, 154*a* and 154*b*, and a respective horizontal panel 146*a* and 146*b* (FIG. 11). Vertical panels 154*a* and 154*b* are each connected to a respective end of rigid or semi-rigid solidification substrate 52 and to a respective horizontal panel 146*a* and 146*b*. Vertical panels 154*a* and 154*b* may be separately formed and then connected to their respective horizontal panels 146*a* and 146*b* or may be formed integrally therewith. Rigid or semi-rigid solidification substrate 52 is transparent and/or translucent and is preferably constructed of glass or hard plastic. In one example, substrate 52 is constructed of a rigid or semi-rigid transparent acrylic polymer. Rigid or semi-rigid solidification substrate 52 includes a first upper surface 188 that faces linear solidification device 42 and a second lower surface 190 that faces film 178 and the solidifiable material. In certain examples, the edges of solidification substrate 52 which are spaced apart along the travel (x) axis are beveled to better allow the second lower surface 189 to reduce the contact surface area between the second lower surface 189 and the film 178, thereby reducing frictional resistance and facilitating the sliding engagement of the second lower surface 189 and film 178.

Timing belts 136*a* and 136*b* (FIG. 8) are used to move rigid or semi-rigid solidification substrate 52 along the travel (x) axis with respect to stationary frame 128, film assembly 130, and the build envelope of the solidifiable material lying underneath film assembly 130 (build envelopes are discussed above with respect to FIGS. 5A and 5B). Timing belts 136*a* and 136*b* are connected to respective pulleys 138*a* and 138*b* at one end and to respective ends 152*a* and 152*b* of motor drive shaft 151 at another end (FIG. 8).

Moving substrate assembly brackets 148*a* and 148*b* are connected to their respective timing belts 136*a* and 136*b* by connectors 137*a* and 137*b* attached to the upper surface of horizontal panels 146*a* and 146*b* and to respective linear bearings (not visible in FIG. 8) on a lower surface of horizontal panels 146*a* and 146*b*. The linear bearings slidingly engage corresponding linear rails 132*a* and 132*b* to facilitate the sliding movement of rigid or semi-rigid solidification substrate 52 along the travel (x) axis direction. Thus, as motor 150 operates, each bracket 148*a* and 148*b* slides along its respective linear rail 132*a* and 132*b* causing rigid or semi-rigid solidification substrate 52 to move along the travel (x) axis direction.

As best seen in FIGS. 10A-C, in one example, outer frame 182 of film assembly 130 is a generally rigid and rectangular structure shaped to cooperatively engage inner frame 176. Inner frame 176 is a generally rigid and rectangular structure which includes an upper lip 186 (FIGS. 10A and 10C) that projects outwardly around the perimeter of inner frame 176. Outer frame 182 fits underneath upper lip 186. In certain examples, the outer edge of lip 186 and the outer perimeter of outer frame 182 are substantially flush with one another and define a substantially continuous outer surface, as illustrated in FIG. 10C.

Together, film 178, outer frame 182, and inner frame 176 define a film assembly 130 that is securable to stationary frame 128. In certain embodiments, it is contemplated that film assembly 130 will be replaced periodically due to the stress on film 178. Thus, film assembly 130 is preferably releasably secured to stationary frame 128 to facilitate replacement of film assembly 130.

Referring to FIGS. 8 and 12, solidification substrate assembly 129 includes a peeling member assembly 131 (FIGS. 8, 12) having at least one film peeling member, which in the depicted embodiment is two film peeling members 142*a* and 142*b*. Film peeling members 142*a* and 142*b* are generally elongated rigid members which are spaced apart from one another along the travel (x) axis direction and on opposite sides of rigid or semi-rigid solidification substrate 52. Solidifiable material solidifies in contact with the film 178 of film assembly 130, and the film 178 is peeled off of the solidified material by peeling members 142*a* and 142*b*.

In one preferred embodiment, film peeling members 142*a* and 142*b* are operatively connected to rigid or semi-rigid solidification substrate 52 to move in a coordinated fashion with rigid or semi-rigid solidification substrate 52. One exemplary apparatus for facilitating this movement is depicted in FIGS. 8 and 12. Each film peeling member 142*a* and 142*b* is connected to an opposite side of two brackets 194*a* and 194*b*. Brackets 194*a* and 194*b* are spaced apart along the scanning (y) axis direction, while peeling members 142*a* and 142*b* are spaced apart along the travel (x) axis.

Bracket 194*a* has an upper surface with connectors 196*a* and 198*a* (FIG. 12) which are configured for connection to complementary connectors 192*a* and 193*a* (FIG. 11) formed in horizontal panel 146*a* of solidification substrate assembly bracket 148*a*. Correspondingly, bracket 194*b* has an upper surface with connectors 196*b* and 198*b* (FIG. 12) which are configured for connection to complementary connectors 192*b* and 193*b* (FIG. 11) formed in horizontal panel 146*b* of solidification substrate assembly bracket 148*b*. Connectors 196 *a/b* and 198 *a/b* may be male or female, threaded or unthreaded. Similarly, complementary connectors 192*a*/193*a* and 192*b*/192*b* may be male or female, threaded or unthreaded. In FIG. 12, connectors 196 *a/b* and 198 *a/b* are male connectors suitable for insertion into corresponding female connectors (e.g., threaded or unthreaded holes) 192 *a/b* and 193 *a/b*.

The connections between brackets 194*a/b* and 148 *a/b* allow film peeling members 142*a* and 142*b* to move in coordination with rigid or semi-rigid solidification substrate 52 as it moves along the travel (x) axis. Peeling members 142*a* and 142*b* are preferably maintained at a fixed distance along the build (z) axis relative to rigid or semi-rigid solidification substrate 52. Rigid or semi-rigid solidification substrate assembly 129 is preferably configured to maintain the upper surface 188 of rigid or semi-rigid solidification substrate 52 beneath inner frame 176 and outer frame 182 of film assembly 130. The lower surface 190 of rigid or semi-rigid solidification substrate 52 is in abutting engagement with film 178, which facilitates the creation of a substantially planar surface of solidifiable material to which solidification energy is supplied.

In preferred embodiments, linear solidification device 42 includes a linear scanning device, and solidification energy is "scanned" in along the scanning (y) axis as the linear solidification device 42 moves along the travel (x) axis. Preferably, the linear solidification device 42 is not itself moved in the y-direction as this occurs. The sequential linear scans in the scanning axis direction may be referred to as "linear scanning operations" herein.

Linear solidification device 42 comprises a solidification energy source 126, a scanning device, and a housing 121. In the embodiment depicted in FIG. 8, the scanning device is a rotating energy deflector 120. In other examples of a linear solidification device 42, the scanning device is a laser scanning micromirror that is used in place of rotating energy deflector 120. Thus, it should be understood throughout that a laser scanning micromirror may be used in place of a rotating energy deflector 120 in the exemplary embodiments described herein.

Suitable laser scanning micromirrors include magnetically-actuated MOEMS (micro-opto-electromechanical systems) micromirrors supplied under the name LSCAN by Lemoptix SA of Switzerland. A linear scanning micromirror comprises a silicon chip with a fixed part and a movable mirror part. The mirror is electrically or magnetically actuated to tilt relative to the fixed part to a degree that corresponds to the actuating signal. As the mirror tilts, received solidification energy is scanned via deflection from the tilting mirror. Thus, the degree of tilt or tilt angle corresponds to the position along the scanning (y) axis at which the deflected solidification energy strikes the surface of the solidifiable material.

Figure 9B:
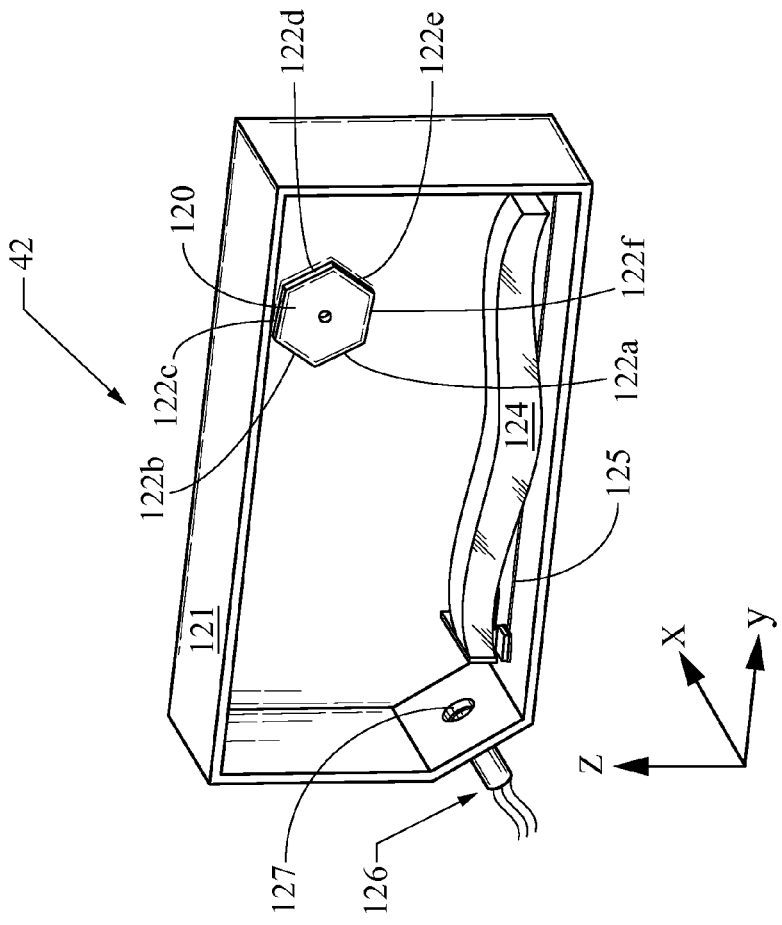
FIGS. 9A and 9B are rear and front perspective views of the linear solidification device shown in FIG. 8.

In certain preferred examples, and as shown in FIGS. 8 and 9B, a lens 124 is provided between the rotating energy deflector 120 and a bottom surface of housing 121 to focus deflected solidification energy and transmit it toward the solidifiable material. In the example of FIGS. 8 and 9B, lens 124 is preferably a flat field lens. In certain examples, the lens 124 is a flat field lens that is transparent to violet and ultraviolet radiation. In additional examples, the lens 124 also has a focal distance that is longer on the ends of the lens relative to the middle (referring to the scanning (y) axis along which the lens 124 length is oriented) to compensate for different solidification energy beam travel distances from the rotating energy deflector 120 to the solidifiable material. In certain implementations, lens 124 includes an anti-reflective coating such that the coated lens transmits at least 90%, preferably at least 92%, and more preferably at least 95% of the incident light having a wavelength ranging from about 380 nm to about 420 nm. In one example, lens 98 transmits at least about 95% of the incident light having a wavelength of about 405 nm. Suitable coatings include single layer, magnesium difluoride ($MgF_2$) coatings, including ARSL0001 MgF2 coatings supplied by Siltint Industries of the United Kingdom.

Housing 121 also includes a substantially linear opening 125 (e.g., a slit) through which light is projected to rigid or semi-rigid solidification substrate 52 and onto the solidifiable material.

As housing 121 moves along the travel (x) axis, solidification energy source 126 and rotating energy deflector 120 move therewith. During this movement, solidification energy, preferably laser light, is periodically or continuously projected from solidification energy source 126 to rotating energy deflector 120. In one preferred embodiment, solidification energy source 126 is a laser diode that emits light in the range of 380 nm-420 nm. A range of 390 nm-410 nm is preferred, and a range of from 400 nm to about 410 nm is more preferred. The laser power is preferably at least about 300 mW, more preferably at least about 400 mW, and even more preferably, at least about 450 mW. At the same time, the laser power is preferably no more than about 700 mW, more preferably no more than about 600 mW, and still more preferably no more than about 550 mW. In one example, a 500 mW, 405 nm blue-light laser is used. Suitable blue light laser diodes include 405 nm, 500 mW laser diodes supplied by Sanyo.

Rotating energy deflector 120 deflects solidification energy that is incident upon it toward flat field lens 124. Rotating energy deflector 120 preferably rotates in a rotation plane as linear solidification device 42 moves along the travel (x) axis. In certain examples, the rotation plane is substantially perpendicular to the direction in which the linear solidification device 42 moves (i.e., the rotation plane is the y-z plane shown in FIG. 8). In certain examples, rotating energy deflector 120 rotates at a substantially constant rotational speed. In other examples, the linear solidification device 42 moves at a substantially constant speed along the travel (x) axis. In further examples, the rotating energy deflector 120 rotates at a substantially constant rotational speed and the linear solidification device 42 moves along the travel (x) axis at a substantially constant speed.

When solidification energy source 126 is a light source, rotating energy deflector 120 is preferably a rotating light deflector capable of deflecting visible or UV light. In one exemplary embodiment, rotating energy deflector 120 is a polygonal mirror having one or more facets 122a, b, c, etc. defined around its perimeter. In the examples of FIGS. 8 and 9A-D, rotating energy deflector 120 is a hexagonal mirror having facets 122a to 122f. Each facet 122a-122f has at least one rotational position, and preferably several, at which it will be in optical communication with solidification energy source 126 to receive light projected therefrom. As the rotating energy deflector 120 rotates, solidification energy (e.g., visible or ultraviolet light) will be deflected along the length of each facet 122a-f in succession. At any one time, one of the facets 122a-122f will receive and deflect solidification energy. As the facet changes its rotational position, the angle of incidence of the solidification energy with respect to the facet will change, altering the angle of deflection, and therefore, the scanning (y) axis location at which the deflected solidification energy strikes the solidification substrate 52 and the solidifiable material underneath it. Thus, each rotational position of rotating energy deflector 120 corresponds to a position along the scanning (y) axis at which solidification energy may be projected at a given time. However, for a given number of rotating energy deflector facets F, there will be F rotational positions that each correspond to a particular position along the scanning axis direction. As will be discussed in greater detail below, one or more controllers or microcontrollers may be provided to regulate the activation and deactivation of the build platform 44/70, solidification energy source 126, rotating energy deflector 120, and motor 150 that drives the linear solidification device 42 across the solidifiable material.

In certain examples, the maximum length of scan in the y-axis direction will correspond to the full length of an individual facet 122a-122f. That is, as the light progressively impinges on the entire length of any one facet 122a-122f, the deflected light will correspondingly complete a full scan length along the scanning (y) axis. The number of facets 122a, 122b, etc. on the rotating energy deflector 120 will correspond to the number of scanning (y) axis scans that are performed for one complete revolution of rotating energy deflector 120. In the case of a hexagonal mirror, six scanning axis scans will occur for every complete rotation of rotating energy deflector 120. For rotating energy deflectors that maintain a constant rotational direction (e.g., clockwise or counterclockwise), the scans will be uni-directional along the scanning (y) axis. Put differently, as light transitions from one facet 122*a* to another 122*b*, the scan will return to its starting position along the scanning (y) axis, as opposed to scanning back in the opposite direction. However, other rotating energy deflector configurations may be used including those in which the rotating energy deflector 120 rotates in two rotational directions to produce a "back and forth" scan in the y-axis direction.

Figure 9A:
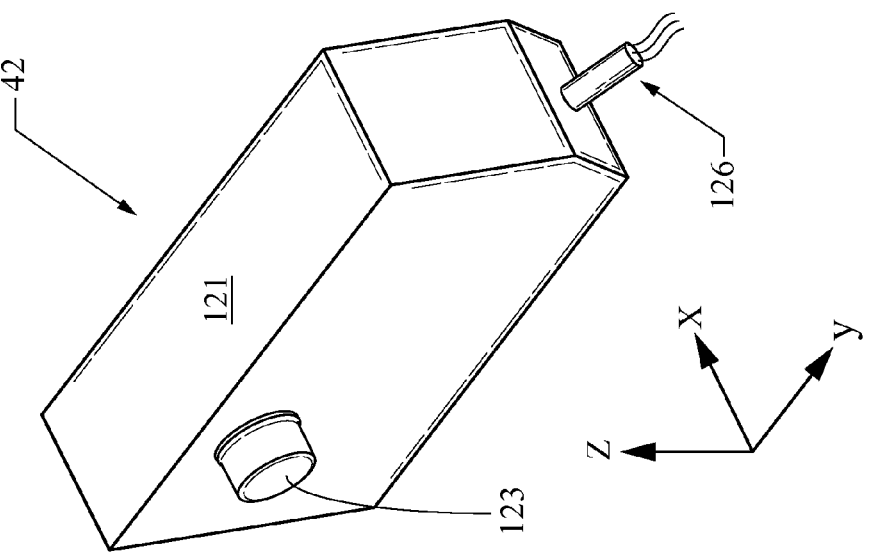

A more detailed view of linear solidification device 42 is provided in FIGS. 9A and 9B, which show opposite sides of the linear solidification device 42. Housing 121 is a generally polygonal structure. As depicted in the figures, housing 121 has an open face, but the face may be closed. Rotating energy deflector 120 is spaced apart from solidification energy source 126 along both the build (z) axis and the scanning (y) axis and may be slightly offset from solidification energy source 126 along the travel (x) axis as well. Rotating energy deflector 120 is rotatably mounted to housing 121 so as to rotate substantially within a plane that may preferably be oriented substantially perpendicularly to the travel (x) axis (i.e., the y-z plane). Solidification energy source port 127 is provided for mounting solidification energy source 126 (e.g., a laser diode) such that it is in optical communication with at least one facet 122*a*-122*f* of rotating energy deflector 120 at one time. As indicated previously, lens 124 is spaced apart and below from rotating energy deflector 120 along the build (z) axis and is located above housing light opening 125 in the system 43 of FIG. 1B. In the system 40 of FIG. 1A, lens 124 is spaced apart and above rotating energy deflector 120 along the build (z) axis and is located below light opening 125.

Motor 123 is mounted on a rear surface of housing 121 and is operatively connected to rotating energy deflector 120. Motor 123 is connected to a source of power (not shown). When motor 123 is energized, rotating energy deflector 120 rotates in the y-z plane, bringing the various facets 122*a*-122*f* sequentially into optical communication with solidification energy source 126. A control unit (not shown) may also be provided to selectively energize motor 123, solidification energy source 126 and/or motor 150 (FIG. 8). Either or both of motors 150 and 123 may be stepper or servo motors. In certain examples, either or both of the motors 150 and 123 are driven by continuous energy pulses. In the case of motor 123, in certain preferred embodiments, it is driven by continuous energy pulses such that the timing of each pulse corresponds to a fixed rotational position of a facet 122*a*-122*f* of rotating energy deflector 120. As the motor is pulsed, each of the facets 122*a*-122*f* will sequentially come into optical communication with solidification energy source 126, and the particular facet that is in optical communication with solidification energy source 126 will have a fixed rotational position that corresponds to the timing of the pulse.

In certain implementations, the rotational position of rotating energy deflector 120 may repeatably correspond to the timing of each motor energy pulse without being known by the operator. The fixed association of the motor energy pulse and the rotational position of the facets 122*a*-122*f* allows the motor pulse timing to be used to synchronize the transmission of a synchronization solidification energy signal from solidification energy source 126 so that a synchronization solidification energy signal is issued for each facet 122*a*-122*f* at some defined rotational position while it is in optical communication with solidification energy source 126.

In certain implementations, it is desirable to provide a scanning (y) axis scanning speed (i.e., a speed at which solidification energy moves along the exposed surface of the solidifiable material) that is significantly greater than the travel (x) axis speed at which the linear solidification device 42 moves. Providing this disparity in scanning (y) axis and travel (x) axis speeds helps to better ensure that the scanned energy pattern is linear and orthogonal to the travel (x) axis direction, thereby reducing the likelihood of object distortion. In certain examples, the scanning speed in the scanning (y) axis direction is at least about 1000 times, preferably at least about 1500 times, more preferably at least about 2000 times, and still more preferably at least about 2200 times the speed of movement of linear solidification device 42 along the travel (x) axis. In one example, linear solidification device 42 moves at a speed of about 1 inch/second along the travel (x) axis and the scanning speed along the scanning (y) axis is about 2400 inches/second. Increasing the scanning speed relative to the speed of movement of linear solidification device 42 along the travel (x) axis increases the resolution of the scanning process by increasing the number of scan lines per unit of length in the x-axis direction.

The scan line frequency (in number of scans per unit time) at which solidification energy is progressively applied to selected areas of a solidifiable resin in the width (y-axis) direction of solidification substrate assembly 129 corresponds to the rotational speed of rotating energy deflector 92 multiplied by the number of facets 122*a*-122*f*. In certain examples, the rotational speed is from about 1,000 to about 10,000 rpm, preferably from about 2,000 to about 8,000 rpm, and more preferably from about 3,000 to about 5,000 rpm.

Figure 9C:
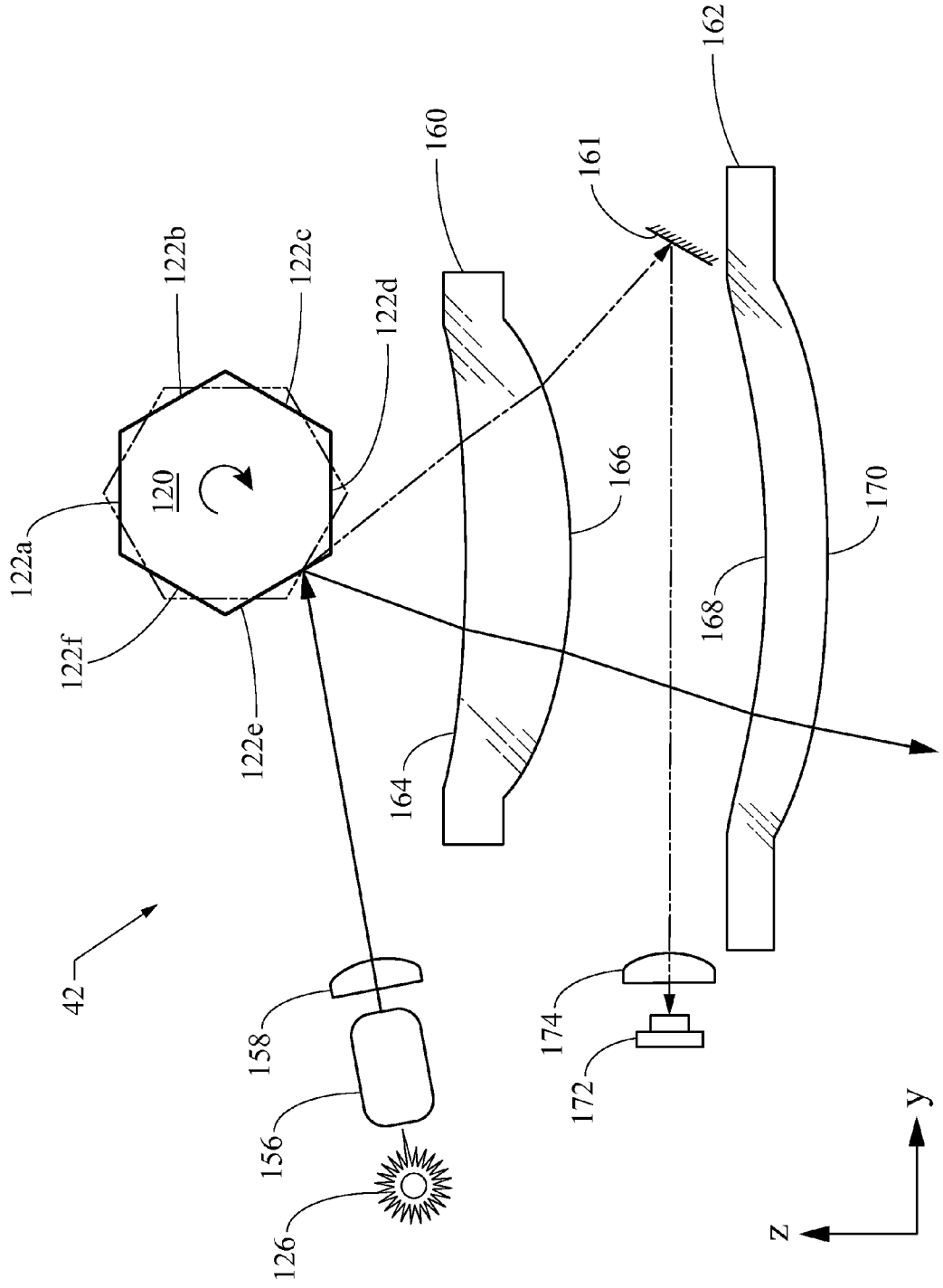
FIG. 9C is a schematic view of a first alternate version of the linear solidification device of FIG. 9A in which the housing is removed and which includes a solidification energy synchronization sensor.

Referring to FIG. 9C, and alternate embodiment of linear solidification device 42 of FIGS. 9A and B is depicted. In FIG. 9C, housing 121 is removed. As shown in the figure, solidification energy source 126 is in optical communication with one facet 122*a*-*f* of rotating energy deflector 120 at any one time as rotating energy deflector 120 rotates in the y-z plane (i.e., the plane orthogonal to the direction of travel of linear solidification device 42). In this embodiment, one or more solidification energy focusing devices is provided between solidification energy source 126 and rotating energy deflector 120. In the example of FIG. 9C, the one or more focusing devices comprises a collimator 156 and a cylindrical lens 158.

Collimator 156 is provided between solidification energy source 126 and cylindrical lens 158. Cylindrical lens 158 is provided between collimator 156 and rotating energy deflector 120. Collimator 156 is also a focusing lens and creates a round shaped beam. Cylindrical lens 158 stretches the round-shaped beam into a more linear form to allow the beam to decrease the area of impact against rotating energy deflector 120 and more precisely fit the beam within the dimensions of one particular facet 122*a*-*f*. Thus, solidification energy transmitted from solidification energy source 126 passes through collimator 156 first and cylindrical lens 158 second before reaching a particular facet 122*a*-*f* of rotating energy deflector 120.

In certain preferred examples, collimator 156 and/or cylindrical lens 158 transmit at least 90%, preferably at least 92%, and more preferably at least 95% of the incident light having a wavelength ranging from about 380 nm to about 420 nm. In one example, collimator 156 and cylindrical lens 158 transmit at least about 95% of the incident light having a wavelength of about 405 nm. In the same or other examples, solidification energy source 126 comprises a laser diode having a beam divergence of at least about five (5) milliradians, more preferably at least about six (6) milliradians, and sill more preferably at least about 6.5 milliradians. At the same time or in other examples, the beam divergence is no more than about nine (9) milliradians, preferably no more than about eight (8) milliradians, and still more preferably not more than about 7.5 milliradians. In one example, the divergence is about 7 milliradians. Collimator 156 is preferably configured with a focal length sufficient to collimate light having the foregoing beam divergence values. Collimator 156 is preferably configured to receive incident laser light having a "butterfly" shape and convert it into a round beam for transmission to cylindrical lens 158.

In certain examples, collimator 156 has an effective focal length that ranges from about 4.0 mm to about 4.1 mm, preferably from about 4.0 mm to about 4.5 mm, and more preferably from about 4.01 mm to about 4.03 mm. In one example, collimator 156 is a molded glass aspheric collimator lens having an effective focal length of about 4.02 mm. One such collimator 156 is a Geltech™ anti-reflective coated, molded glass aspheric collimator lens supplied as part number 671TME-405 by Thorlabs, Inc. of Newton, N.J. This collimator is formed from ECO-550 glass, has an effective focal length of 4.02 mm, and has a numerical aperture of 0.60.

In certain examples, collimator 156 and/or cylindrical lens 158 are optimized based on the specific wavelength and beam divergence characteristics of solidification energy source 126. In one example, collimator 156 and/or cylindrical lens 158 are formed from a borosilicate glass such as BK-7 optical glass. In certain preferred examples, collimator 156 and/or cylindrical lens 158 are coated with an anti-reflective coating such that the coated collimator 156 and coated cylindrical lens 158 transmit at least 90%, preferably at least 92%, and more preferably at least 95% of the incident light having a wavelength ranging from about 380 nm to about 420 nm. Suitable anti-reflective coatings include magnesium difluoride ($MgF_2$) coatings such as the ARSL0001 MgF2 coating supplied by Siltint Industries of the United Kingdom.

In certain examples of a linear solidification device 42, the solidification energy defines a spot (which may or may not be circular) at the point of impingement on the solidifiable material. The angle of incidence between the solidification energy and the solidifiable material will vary with the rotational position of a given facet 122a-f relative to the solidification energy source 126. The spot dimensions and shape will also tend to vary with the angle of incidence. In some cases, this variation in spot size and/or spot dimensions can produce uneven solidification patterns and degrade the accuracy of the object building process. Thus, in certain examples, one or more lenses are provided between rotating energy deflector 120 and the solidifiable material to increase the uniformity of the spot size and/or dimensions as the rotational position of rotating energy deflector 120 changes. In certain examples, the one or more lenses is a flat field lens 124 (FIGS. 9A and 9B). In other examples (FIG. 9C), the one or more lenses is an F-Theta lens (160 or 162). In other examples, and as also shown in FIG. 9C, the one or more lenses is a pair of F-Theta lenses 160 and 162. The F-Theta lenses 160 and 162 are spaced apart from one another and from the rotating energy deflector 120 along the build (z) axis. First F-Theta lens 160 is positioned between second F-Theta lens 162 and rotating energy deflector 120. Second F-Theta lens 162 is positioned between first F-Theta lens 160 and the solidifiable material (as well as between first F-Theta lens 160 and light opening 125, not shown in FIGS. 5C-D).

First F-Theta lens 160 includes an incident face 164 and a transmissive face 166. Incident face 164 receives deflected solidification energy from rotating energy deflector 120. Transmissive face 166 transmits solidification energy from first F-Theta lens 160 to second F-Theta lens 162. Similarly, second F-Theta lens 162 includes incident face 168 and transmissive face 170. Incident face 168 receives solidification energy transmitted from transmissive face 166 of first F-Theta lens 160, and transmissive face 170 transmits solidification energy from second F-Theta lens 162 to housing light opening 125 (not shown in FIG. 5C) and to the solidifiable material.

In certain implementations of the linear solidification device of FIG. 5C, first F-Theta lens 160 has a refractive index that is less than that of second F-Theta lens 162. The relative difference in refractive indices helps reduce laser beam scattering losses. At the same time or in other implementations, the radius of curvature of first F-Theta lens transmissive face 166 is less than the radius of curvature of second F-Theta lens transmissive face 170. Suitable pairs of F-Theta lenses are commercially available and include F-Theta lenses supplied by Konica Minolta and HP. In certain embodiments, the F-Theta lenses 160 and 162 are preferably coated with an anti-reflective coating. The anti-reflective coating is used to maximize the amount of selected wavelengths of solidification energy that are transmitted through F-Theta lenses 160 and 162. In one example, the anti-reflective coating allows the coated F-Theta lenses 160 and 162 to transmit greater than 90 percent of the incident solidification energy having a wavelength between about 325 nm and 420 nm, preferably greater than 90 percent of the incident solidification energy having a wavelength between about 380 nm and about 420 nm, more preferably greater than about 92 percent of the incident solidification energy having a wavelength between about 380 nm and about 420 nm, and still more preferably greater than 95 percent of the incident solidification energy having a wavelength between about 380 nm and about 420 nm. In one specific example, the coated F-theta lenses transmit at least about 95% of the incident light having a wavelength of about 405 nm (i.e., blue laser light). In other preferred embodiments, collimator 156, and cylindrical lens 158 are also coated with the same anti-reflective coating. Suitable anti-reflective coatings include magnesium difluoride (MgF2) coatings such as the ARSL001 coating supplied by Siltint Industries of the United Kingdom.

In certain examples, linear solidification device 42 may comprise multiple solidification energy sources. In some implementations, the linear solidification device 42 may include multiple solidification energy sources that provide solidification energy of the same wavelength, and the device 42 may transmit a single beam of solidification energy to the solidifiable material. In other implementations, the device 42 may include solidification energy sources of different wavelengths and selectively transmit solidification energy of only one of the wavelengths to a solidifiable material. This implementation may be particularly useful when a three-dimensional object is built using multiple solidifiable materials each of which solidifies in response to solidification energy of different wavelengths (e.g., because their photoinitiators are activated by different wavelengths of solidification energy).

Figure 9D:
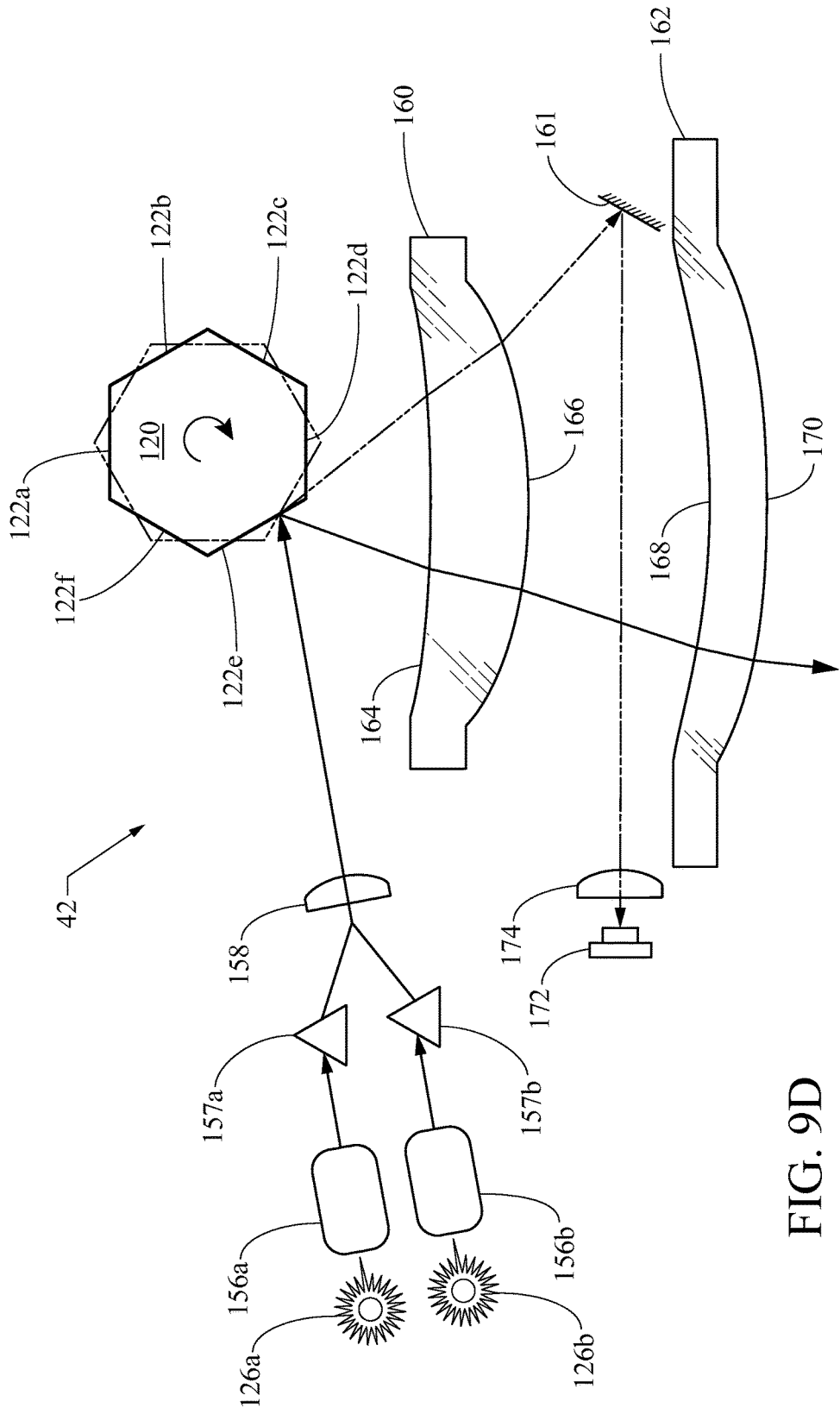
FIG. 9D is a schematic view of a second alternate version of the linear solidification device of FIG. 9A in which the housing is removed and which includes dual solidification energy sources and a solidification energy sensor.

Referring to FIG. 9D, an alternate version of linear solidification device 42 (with the housing removed) is depicted in schematic form. The linear solidification device 42 is the same as the one depicted in FIG. 9C with two exceptions. First, the linear solidification device 42 of FIG. 5D includes two solidification energy sources 126a and 126b. In the specific embodiment of FIG. 9D, solidification energy sources 126a and 126b transmit solidification energy of substantially the same wavelength. In some cases, the use of such multiple solidification energy sources 126a, 126b is desirable in order to increase the power of the solidification energy transmitted to the solidifiable material. The power of the solidification energy can affect the rate of solidification, which in turn may limit the maximum speed of travel of the linear solidification device 126 along the travel (x) axis. In order to solidify, for example, a given volume of a solidifiable resin, the volume must receive sufficient solidification energy (e.g., in Joules). The solidification energy received by a given volume of solidifiable material is a function of the power (e.g., in Watts) of the solidification energy and the time of exposure of the volume of solidifiable material. As a result, as the power is reduced, the rate of travel of the linear solidification device 42 along the travel (x) axis must be reduced to ensure that sufficient solidification energy is received at each location along travel (x) axis. Put differently, at a desired solidification depth along the build (z) axis, increasing the power of the solidification energy increases the rate at which the linear solidification device 42 can travel along the travel (x) axis, and hence, the speed of an object build process.

The second difference between the solidification energy devices 42 of FIGS. 9C and 9D is the inclusion of prisms 157a and 157b in FIG. 9D. The linear solidification device 42 of FIG. 9D is intended to combine solidification energy from both sources 126a and 126b into a single beam for delivery to the solidifiable material. The single beam preferably has a power that is at least 1.5 times, preferably at least 1.7 times, and more preferably at least 1.95 times the average power of the individual solidification energy sources 126a and 126b. Each solidification energy source 126a and 126b transmits its respective solidification energy to a respective prism 157a and 157b. The prisms 157a and 157b receive incident solidification energy at a first angle and deflect the energy to produce transmitted solidification energy beams at a second (different) angle that allows the individual beams to be combined in a single beam. It is believed that the individual beams combine ahead of cylindrical lens 158, after which the solidification energy is received by rotating energy deflector 120 and ultimately transmitted to the solidifiable material in the same manner described previously with respect to FIG. 9C.

As mentioned previously, the linear solidification device 42 of FIGS. 9C and 9D also includes a solidification energy sensor 172, which may be an optical sensor. Suitable optical sensors include photodiodes. One exemplary photodiode that may be used is a 404 nm, 500 mW photodiode supplied by Opnext under the part number HL40023MG.

Solidification energy sensor 172 generates a signal upon receipt of solidification energy. Mirror 161 is provided and is in optical communication with rotating energy deflector 120 such that when each facet 122a-f of rotating energy deflector 120 receives solidification energy from solidification energy source 126 while at a particular rotational position (or range of positions) in the y-z plane, the energy will be deflected toward mirror 161 (as shown by the dashed lines). Similarly, when the scanning device used in linear solidification device 42 is a linear scanning micromirror, a particular tilt angle or range of tilt angles will cause received solidification energy to be deflected toward mirror 161. The solidification energy then reflects off of mirror 161 along a path that is substantially parallel to the scanning (y) axis between first F-Theta lens 160 and second F-Theta lens 162 to sensor 172. Sensor 172 may be operatively connected to a computer to which it will transmit the signal generated upon receipt of solidification energy. The signal may be stored as data and/or used in programs associated with a solidification energy source controller (not shown). An example of a line scanning synchronization method that makes use of the generated sensor signal is described below.

In certain examples, sensor 172 is used to determine the beginning of a line scanning operation along the scanning (y) axis. In other examples, as described further below with respect to FIGS. 13-15, the sensor 172 is used to determine when solidification energy will first be transmitted to a path generation reference frame border defined by the maximum scan line length ($SL_{LMAX}$) of the linear solidification device 42.

In certain cases using the solidification energy sources 126 described herein, the intensity of the solidification energy transmitted by solidification energy source 126 may be higher than desired, thereby reducing the sensitivity of sensor 172 due, at least in part, to the presence of scattered and ambient light. As a result, in some implementations a filter 174 is provided between sensor 172 and mirror 161 along the path of travel of solidification energy from mirror 161 to sensor 172. Filter 174 preferably reduces the intensity of electromagnetic radiation received by sensor 172 without appreciably altering its wavelength(s). Thus, in one example filter 174 is a neutral density filter. One such suitable neutral density filter is a 16× neutral density filter supplied by Samy's Camera of Los Angeles, Calif. under the part number HDVND58. In certain implementations, sensor 172 is used to synchronize a timer that serves as a reference for linear scanning operations. In such cases, the exposure of sensor 172 to scattered or ambient light may cause synchronization errors. Thus, filter 174 is preferably configured to ensure that only direct solidification energy from solidification energy source 126 is received by sensor 172.

One way of selectively projecting solidification energy to the solidifiable material is to selectively activate the solidifiable energy source 126 based on the travel (x) axis location of the linear solidification device 42 and solidification energy source even data corresponding to the travel (x) axis location. While each facet 122a-122f will have a full range of locations along its length at which solidification energy may be received from solidification energy source 126, it will not necessarily be the case that each such facet location will receive solidification energy during any individual scan performed by that facet. Thus, by (directly or indirectly) coordinating the activation of solidification energy source 126 with the rotational position of a given facet 122a-122f, solidification energy can be selectively provided to only those locations along the scanning (y) axis where solidification is desired.

The number of linear scans that can be performed within a given linear distance along the travel (x) axis may depend on several variables, including the rotational speed of rotating energy deflector 120, the number of facets F on the rotating energy deflector 120, and the speed of movement ($v_x$) of the linear solidification device 42 along the travel (x) axis. In general, as the speed of movement $v_x$ of the linear solidification device 42 along the travel (x) axis increases, the number of linear scans per unit of travel (x) axis length decreases. However, as the number of facets on the rotating energy deflector 120 increases or as the rotational speed of the rotating energy deflector 120 increases, the number of linear scans per unit of travel (x) axis length increases.

Thus, for a given build envelope distance L along the travel (x) axis in units such as millimeters, the maximum number of line scanning operations that can be performed may be calculated as follows:

$$n_{max}=(L/v_x)*(RPM/60)*F \quad (3)$$

where,
- $n_{max}$=maximum number of line scanning operations along the travel (x) axis within the build envelope;
- L=desired length of the build envelope along the travel (x) axis (mm);
- $v_x$=speed of movement of the linear solidification device 42 along the travel (x) axis (mm/sec);
- RPM=rotational frequency of rotating energy deflector 120 (revolutions/minute); and
- F=number of facets on the rotating energy deflector 120.

Each linear scan can then be assigned a linear scan index n (which can also be called a string index when sets of data strings are used as object layer data) ranging from a value of 1 to $n_{max}$. Equation (3) can also be used to calculate an actual number of line scanning operations needed for a given part length along the travel (x) axis. In that case, L would be the desired length of the part along the travel (x) axis and $n_{max}$ would be replaced by n, which would represent the total number of line scanning operations used to form the part.

When the linear solidification device 42 is moving at a constant speed $v_x$ along the travel (x) axis, a motor movement parameter such as a number of motor steps for motor 150 may be correlated to the build envelope travel (x) axis length L (FIG. 5A) and used to define a variable W which equals a number of motor steps/L. The microcontroller unit can then use the number of motor steps to indirectly determine the number of a linear scan (or string index as described further herein) position of the linear solidification device within the build envelope in accordance with the following equation:

$$\text{scan index } n = ((\text{number of steps from boundary})/(W)(S))*(RPM/60)*F \quad (4)$$

In equation (4), the number of steps from the boundary refers to the number of motor steps counted starting at build envelope boundary 103 and moving from left to right or starting at build envelope boundary 105 and moving from right to left. A particular three-dimensional object layer having a length may be formed by a number of linear scans performed within build envelope 102.

In certain examples, the host computer will assign scan index numbers or string data index numbers by scaling the object model (e.g., object model 78 in FIG. 2A) to the build envelope 102 size and assigning a scan index number n based on the total number of possible scans $n_{max}$ in the build envelope 102. The scan index numbers n will then be correlated to a number of motor steps as set forth in equation (5). This relationship depends, in part, on the accuracy of the value W which is the ratio of the number of steps required for the linear solidification device 42 to traverse the build envelope length L (FIG. 5A) divided by L. In some cases, W may deviate from the value predicted by geometry of the mechanical devices used to move the linear solidification device 42 (e.g., in the case of FIG. 8, the value predicted by the gear ratio for motor 150, the rotational speed of motor 150, and the pulley diameter of pulleys 138a and 138b). In that case, it may be desirable to adjust the value of W by building parts and adjusting values of W until the desired dimensions are observed.

As indicated previously, the systems for making a three-dimensional object described herein may include a control unit, such as a microcontrol unit or microcontroller, which contains locally stored and executed programs for activating motors 150 (FIG. 8) and 123 (FIG. 9A) and moving build platform 44, 70, as well as for selectively activating solidification energy source 126. In certain examples, the systems include a host computer that processes three-dimensional object data into a format recognized by the microcontroller unit and then transmits the data to the microcontroller for use by the microcontroller unit's locally stored and executed programs. As used herein, the term "microcontroller" refers to a high-performance, programmable computer memory system used for special tasks. In certain examples, the microcontrollers described herein include an integrated circuit chip having a microprocessor, a read only memory (ROM), interfaces for peripheral devices, timers, analog to digital and digital to analog converters, and possibly other functional units.

Referring again to FIG. 5A, in certain implementations, linear solidification device 42 is positioned within the build envelope 102 such that the mirror 161 (FIGS. 9C-D) is located immediately proximate first scanning-axis build envelope boundary 104 (wherein scanning occurs along the direction from first scanning (y) axis build envelope boundary 104 to second scanning (y) axis build envelope boundary 107. In such implementations, the receipt of solidification energy by sensor 172 indicates that a line scanning operation may begin immediately thereafter because if the solidification energy source 126 remains activated and if rotating energy deflector 120 continues to rotate, solidification energy will be transmitted to the solidifiable material at the first scanning (y) axis build envelope boundary 104 immediately after it is transmitted to mirror 161. Therefore, sensor 172 can be used to indicate the beginning of a line scanning operation for each facet 122a-f. In other implementations, and as described below with respect to FIGS. 13-15, linear solidification device 42 defines the scanning (y) axis length of a path generation reference frame, and the build envelope has a scanning (y) axis that is less than that of the path generation reference frame. In such cases, the mirror 161 is located immediately proximate the scanning axis border of the path generation reference frame, and the build envelope scanning axis border 104 is spaced apart from the path generation reference frame scanning axis border by a distance along the scanning axis of the path generation reference frame.

As mentioned previously, when solidification energy source 126 remains activated while rotating energy deflector 120 completes a single revolution, a number of linear scanning operations will be completed in the scanning axis direction which equals the number of the rotating energy deflector's 120 facets 122a-f.

In those cases where sensor 172 is used to indicate the beginning of a line scanning operation, it is useful to briefly activate solidification energy source 126 at a specific moment at which the transmitted solidification energy will be received by mirror 161. The brief activation of solidification energy source may be coordinated or synchronized with an actuating signal sent to the scanning device used in linear solidification device 42. For example and as mentioned previously, in certain cases motor 123 is energized by a constant frequency pulse, the timing of which corresponds to a fixed rotational position for the particular facet 122a-f that is in optical communication with solidification energy source 126. Therefore, through a process of trial and error a lag time may be determined between the leading or trailing edge of the motor pulses and the receipt of solidification energy by sensor 172. More specifically, the source of solidification energy 126 can be selectively activated at a number of times relative to the leading or trailing edge of the pulse to determine which lag time results in the generation of a solidification energy sensor signal by sensor 172. In one preferred embodiment, the solidification energy source 126 is activated at or within a specified time following the trailing edge of the energy pulse used to drive motor 123.

Figure 13:
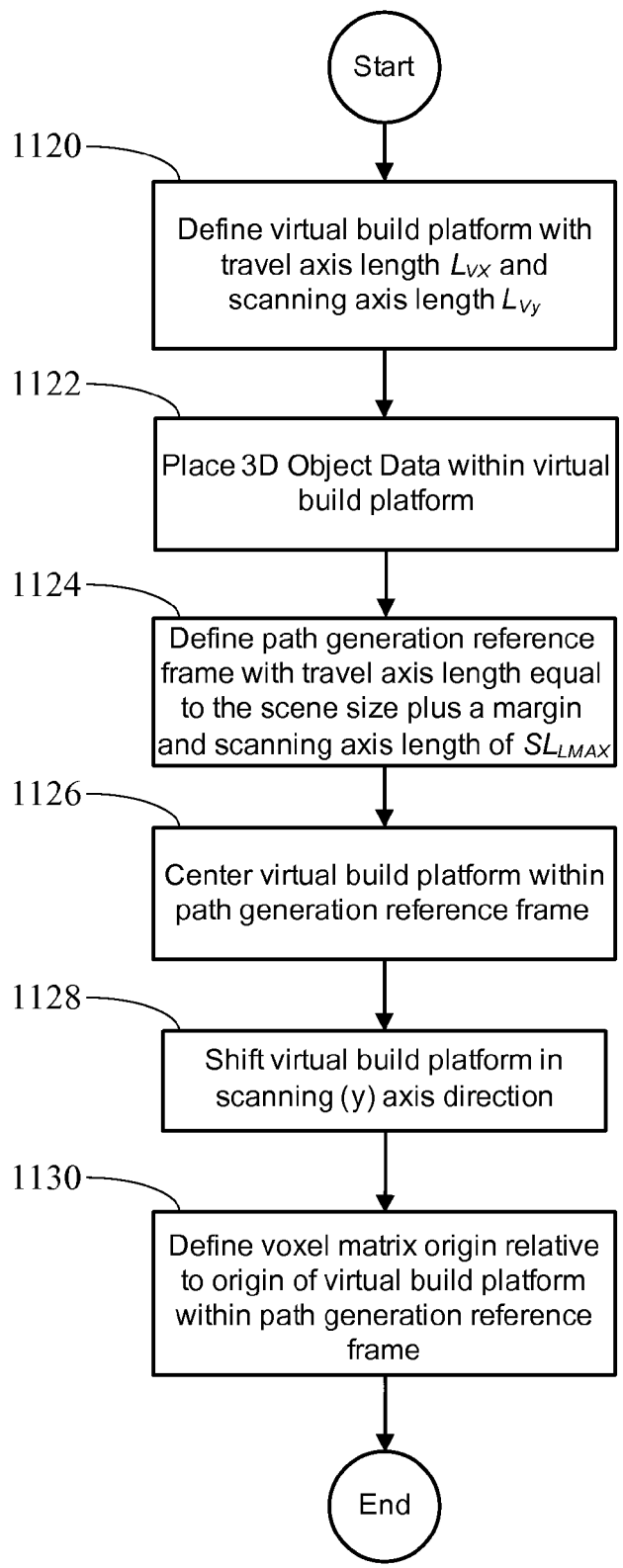
FIG. 13 is a flow chart depicting a method of orienting three-dimensional object data relative to a path generation reference frame of an apparatus for making three-dimensional objects for use in generating solidification energy source event data from voxel data.
Figure 14:
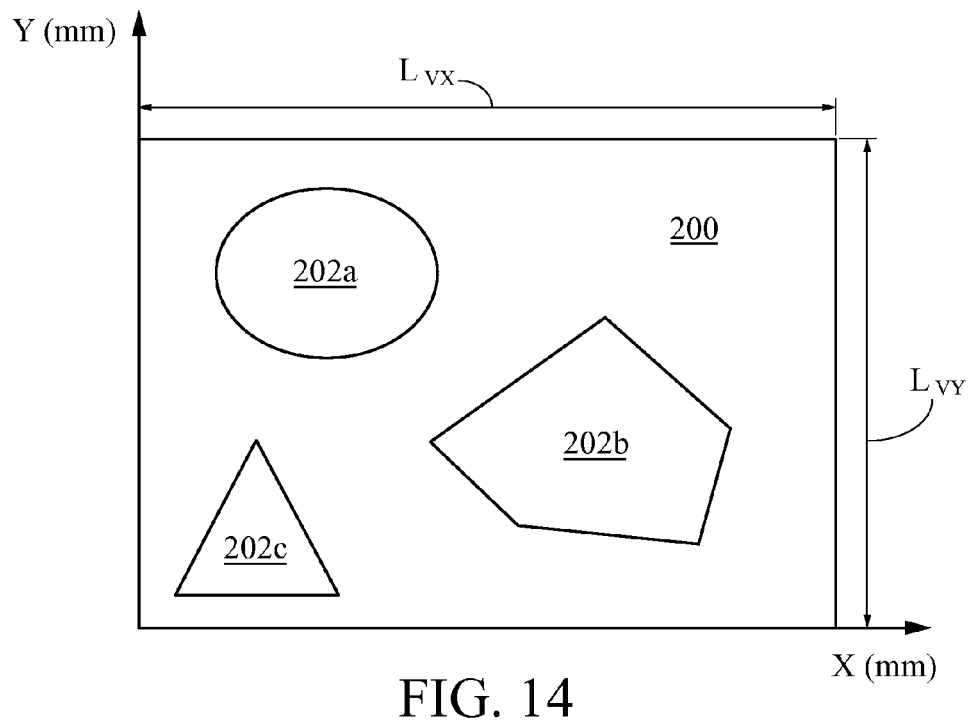
FIG. 14 is an illustration of a virtual build platform of an apparatus for making a three-dimensional object.

In certain cases, the sensor 172 may be unnecessary because a specified lag time relative to the energization pulses that drive motor 123 will reliably indicate when a line scanning operation is about to begin (assuming solidification energy source 126 remains activated) or at which it is capable of beginning within the path generation reference frame (FIGS. 13-15). However, in some examples, the pulses cannot be used to reliably indicate when a line scanning operation is about to begin within the desired degree of precision. For example, the facets 122a-f of rotating energy deflector 120 may not be perfectly or consistently planar. In that case, the scanning (y) axis position of solidification energy may not correlate well with the rotational position of rotating energy deflector 120. In addition, heat generated by solidification energy source 126 can cause slight variations in the path of the solidification energy toward the solidifiable material and the angle of incidence at which it strikes the solidifiable material. Thus, sensor 172 assists in better determining the time at which a line scanning operation may begin (or is about to begin if the solidification energy source 126 remains activated). This is particularly helpful when object data is stored as solidification time values because the solidification time values can be more reliably correlated to specific positions along the scanning axis direction relative to the scanning axis boundary 104 of build envelope 102 (FIG. 5A) and/or relative to the path generation reference frame scanning axis border 201 (FIG. 15). In certain examples, a timer is set to zero when sensor 172 generates a synchronization signal, and the solidification energy source event data is specified as time values, relative to the zero time value, at which the energization state of solidification energy source 126 is changed.

The method of generating solidification energy source event data from three-dimensional object data of FIGS. 7A and 7B involves a step of defining the three-dimensional object data in a reference coordinate system (step 1002). FIG. 13 is a flow chart describing one example method by which step 1002 can be carried out. In certain preferred examples, the method of FIG. 13 is implemented in a system in which the linear solidification device 42 is centered along the scanning axis length of build envelope 102 and the three-dimensional object being built is also centered with respect to the scanning axis mid-point of linear solidification device 42. Especially in those implementations that use solidification times such as CPU tick values as solidification energy source event data, this configuration is preferred. To maintain centering with respect to scanning axis mid-point of the linear solidification device, the method of FIG. 13 uses a "path generation reference frame" with a travel (x) axis length equal to a scene size plus a margin and a scanning (y) axis length equal to the maximum possible scan length of the linear solidification device. A "scene" is a graphical representation of a defined area that includes one or more three-dimensional objects to be built during a given three-dimensional object manufacturing process. The scene size is the size of a bounding box that encompasses the objects comprising the scene and may not exceed the size of the build envelope. The method further defines a "virtual build platform" used to calculate solidification energy source event data values (e.g., CPU ticks) that will ultimately center the three-dimensional object at the scanning (y) axis mid-point of the linear solidification device 42 and the mid-point of the actual build envelope 104 (i.e., the mid-point between the scanning axis borders 104 and 107 of FIG. 5A. Thus, as used herein, the "path generation reference frame" is a reference coordinate system that relates the voxel data to actual positions in a system for making three-dimensional objects, such as those illustrated in FIGS. 1A, 1B, and 8. The use of a path generation reference frame as described herein ensures that three-dimensional objects will be built within the build envelope 102 (FIG. 5A) of the particular apparatus being used to manufacture the objects. In preferred examples, the scanning (y) axis length of the path generation reference frame equals the maximum length that solidification energy could traverse the scanning (y) axis based if solidification energy is projected along the entire length of any of the facets 122a-f and deflected onto the travel axis/scanning axis plane. The origin and terminal points of the path generation reference frame may not be within build envelope 104 or even within the area of the travel axis/scanning axis plane where solidifiable material is located.

As indicated with respect to FIGS. 1A and 1B, systems and apparatuses suitable for use with the methods described herein include a build platform 44, 70 on which a three-dimensional object is progressively built and a linear solidification device 42 aligned with the build platform 44, 70 along the scanning (y) axis which is movable over along the travel (x) axis through the same travel (x) axis region occupied by the build platform 44, 70. The build platform 44, 70 includes the actual build envelope 102 of FIG. 5A and defines a maximum x-y area upon which a three-dimensional object may be built.

FIG. 14 depicts an illustrative example of a virtual build platform 200 having a length $L_{VX}$ along the travel (x) axis and a length $L_{VY}$ along the scanning (y) axis. Images 202a-202c of models of three-dimensional objects defined by three-dimensional object data are positioned within the virtual build platform.

FIG. 15 depicts an illustrative example of a path generation reference frame 204. The path generation reference frame 204 has a length along the scanning (y) axis of $SL_{LMAX}$ which is the maximum scan line length of the linear solidification device 42 along the scanning (y) axis. When linear solidification device 42 is installed on an actual apparatus for making three-dimensional objects, the location and geometry of the rotating energy deflector 120 and the length and position of housing opening 125 become fixed in space, as does the spacing between the exposed surface of the solidifiable material and the linear solidification device housing opening 125. As a result, a scanning axis border 201, representing the first possible location along the scanning axis at which solidification energy could be transmitted to the solidifiable material, is defined. In certain implementations described herein, the border of the scanning axis border 104 of build envelope 102 (and the corresponding border 206 of the virtual build platform) will be spaced apart along the scanning (y) axis from the scanning axis border 201 of the path generation reference frame. In addition, the length of the build envelope 102 along the scanning (y) axis (and of the length of the virtual build envelope) will be less than the length $SL_{LMAX}$ of the path generation reference frame scanning axis.

The value of $SL_{LMAX}$ can be determined by activating the solidification energy source 126 as the rotating energy deflector 120 rotates so that solidification energy is deflected off the entire length of at least one of the facets 122a-122f. The path generation reference frame has a maximum travel axis (x) length defined by the scene size plus a specified margin. As indicated previously, the scene size preferably does not exceed the size of the build envelope 102 along either the travel (x) or scanning (y) axis to ensure that the three-dimensional object(s) defined within the scene are built within the build envelope 102. The virtual build platform 200 is shown at three different path generation reference frame 204 locations (as indicated in three-boxes within the path generation reference frame 204) in FIG. 15. Each box shows a different possible position of the virtual build platform 200 within path generation reference frame 204. The virtual build platform has a first scanning (y) axis border 206 along the path generation reference frame 204 scanning (y) axis and a second scanning (y) axis border 208 long the path generation reference frame 204 scanning (y) axis. The borders 206 and 208 are spaced apart by a fixed distance but will move to different scanning (y) axis locations within the path generation reference frame 204 when the virtual build platform 200 is repositioned within the path generation reference frame 204. If the solidification energy source 126 remains activated as the rotating energy deflector 120 rotates, each scan line would start at scanning axis border 201 and end at a location spaced apart from the scanning axis border 201 by $SL_{LMAX}$. However, in actual operation to make a three-dimensional object, full length scan lines 108 (FIG. 5B) begin at scanning axis border 104 and end at scanning axis border 107 by appropriately adjusting the activation of solidification energy source 126.

Referring again to FIG. 13, in step 1120 a virtual build platform 200 such as the one illustrated in FIG. 14 is defined with a travel axis length $L_{VX}$ and a scanning axis length $L_{VY}$. In certain examples, the values of $L_{vx}$ and $L_{vy}$ are determined based on the dimensions of the build platform 44 and/or other hardware or software restrictions. In one example, an apparatus is provided with a linear solidification device mounted above a build platform such that 66,000 cpu ticks (theoretically) corresponds to a scanning (y) axis solidification length of 250 mm. Thus, Lvy is less than or equal to 250 mm. However, due to the hardware set-up and the construction of the linear solidification device, the working range of time values (CPU ticks) during which solidification along the scanning (y) axis is possible is 5000 to 50,000 CPU ticks. This range will limit Lvy to a value of about 170 mm. Lvy is chosen to be close to this value and is set at 160 mm. The memory of the control unit used to toggle the solidification energy source is also limited to 8 MB, which constrains the number of solidification energy source events (e.g., toggle events) per layer. The memory restriction affects both Lvy and Lvy. However, Lvx is not limited by mechanical or hardware limitations, but rather, only by the memory limitation. Based on this limitation and the selected value of Lvy, Lvx is selected to be 250 mm.

In step 1122, three-dimensional object data defining the three-dimensional object is provided and is placed within the virtual build platform 200. Although this is step is illustrated graphically in FIG. 14, it is performed mathematically by relating the reference coordinate system that defines the three-dimensional object data (e.g., the STL file reference coordinate system) to the virtual build platform 200 reference coordinate system (e.g., the x-y axes in FIG. 14) and making the appropriate x, y translations of the three-dimensional object data.

In step 1124 a path generation reference frame is defined with a scanning (y) axis length of $SL_{LMAX}$ and a travel (x) axis length equal to the scene size plus a margin. The virtual build platform 202 is then centered within the path generation reference frame 204 in step 1126. This is depicted graphically in FIG. 15 by the movement of the virtual build platform 200 shown in solid lines at the lower left-hand corner of the path generation reference frame 204 to the center of the path generation reference frame 204 as indicated by the upper box in dashed lines with the text "After Offsetting." In certain preferred examples, the use of the centering step 1126 helps ensure that the three-dimensional object(s) is produced within build envelope 102 (FIG. 5A).

Based on the scanning speed Sin mm/sec of the linear solidification device 42 along the scanning (y) axis, one could predict the CPU tick value at which the border 206 (i.e., the border 206 for the upper dashed box) would be reached:

$$t(206)=y(206)/S \qquad (5)$$

wherein,
  t(206) equals solidification (scanning) time relative to a the beginning of a scan line at path generation reference frame border 201 (CPU ticks);
  y(206)=the distance between the border 206 of the upper dashed box in FIG. 14 and the path generation reference frame border 201 (mm); and
  S=scanning speed along the scanning (y) axis (mm/sec).

In certain systems for making three-dimensional objects, the relationship of equation (6) will not hold because of hardware imperfections, variations in the size of the area upon which the solidification energy is incident at each tick value, and other factors. In step 1128, the virtual build platform 200 is shifted along the scanning (y) axis of the path generation reference frame to account for an observed shift in the area of solidification along the scanning (y) axis as follows:

$$t(206)_{shift}=(y(206)+\text{Shift})/S \qquad (6)$$

wherein,
  y(206) is defined as above for equation (6),
  Shift=an observed shift in the scanning (y) axis location (mm) at which solidification begins when solidification energy is transmitted at t(206) relative to y(206); and
  $t(206)_{shift}$=the solidification time (in CPU ticks) that causes solidification energy to be received at y(206) relative to a zero solidification time value at path generation reference frame border 201.

Thus, if the actual build envelope 104 is centered within the path generation reference frame of the system for making a three-dimensional object, shifting the virtual build platform 200 along the scanning (y) axis to account for the Shift should ultimately center the actual build envelope at the scanning axis mid-point of the linear solidification device 42. Thus, along with centering step 1126, offsetting step 1128 aids in ensuring that the three-dimensional object or objects within a given scene are built within build envelope 102 (FIG. 5A).

The completion of step 1128 yields three-dimensional object data that is oriented within a virtual build platform 200 at a specific location within a path generation reference frame 204. In step 1130, the voxel matrix 87 (FIG. 4A) is superimposed (mathematically) over the model of the three-dimensional object defined by the three-dimensional object data such that each voxel in the voxel matrix (having indices i, j, and k) may be related to a position on the path generation reference frame 204 coordinate system. This superposition process defines intersections between the scanning (y) axis facets of each active voxel identified in steps 1012 and 1018 of FIG. 7A and the scanning (y) axis of the path generation reference frame. Based on these intersections and the scanning speed of the linear solidification device, solidification energy source event data values may be assigned to data strings in steps 1040 and 1041 of FIG. 7A and used by a controller to determine when to selectively activate the solidification energy source 126 as the linear solidification device moves along the travel (x) axis.

As mentioned previously, in some cases, the relationship between a position along the scanning (y) axis within build envelope 102 (or in path generation reference frame 204) and solidification energy source event data (e.g., CPU tick values) will not be linear. In certain cases, linear solidification devices 42 utilizing a rotating energy deflector 120 may be subject to variability in the linear scanning speed along the scanning (y) axis. Each facet 122a-f will have a rotational position corresponding to a location along the scanning (y) axis (i.e., a "center point") at which solidification energy will be deflected perpendicularly to the solidifiable material and to the opening 125 in the housing 121 of the linear solidification device 42. At the center point, the distance traveled by the solidification energy from the rotating energy deflector 120 to the solidifiable material will be at a minimum relative to locations away from the center point. At rotational positions located away from the center point along the scanning (y) axis, the speed of scanning along the scanning (y) axis will be faster than proximate the center point. In addition, the speed will increase as the distance from the center point increases. At a constant rotational frequency for rotating energy deflector 120, the speed increase is directly proportional to the distance from the center point. This scanning speed variation, in turn, causes the length of solidification along the scanning (y) axis per unit solidification time to vary with the solidification time and the scanning axis position.

This variation in scanning speed as a function of scanning (y) axis position can produce inaccuracies in the three-dimensional object. In certain examples, a three-dimensional object is mapped within a build envelope such that the object dimensions dictate specific object coordinates in the scanning (y-axis) direction. The coordinates can be translated to solidification time values indicative of a change in the energization state of a solidification energy source if the scanning speed is constant. However, if time values are used as solidification source event data, variable scanning speeds will cause the coordinates of the solidified object (and the object dimensions) to vary relative to the coordinates dictated by the object data because the scanning speed will vary with scanning axis position. In addition, variable scanning speeds can result in solidification energy densities that vary with scanning axis position because areas that are scanned quickly will have reduced solidification energy exposure times—and therefore reduced solidification energy densities—relative to areas that are scanned more slowly. As a result, hardening depths that vary with scanning axis position may result.

In certain cases, it is desirable to convert solidification energy source event data to corrected solidification energy source event data to compensate for variations in scanning speed and/or energy density along the scanning (y) axis. The original object data preferably comprises a plurality of original object data sets each for an object cross-section and corresponding to a build axis (z) location. Each original object data set comprises a plurality of original solidification energy source event data items, wherein each data item is indicative of a change in the energization state of a solidification energy source. In certain examples, steps 1041 and 1053 of FIG. 7A provide corrected solidification energy source event data values to correct for this variation.

Figure 16:
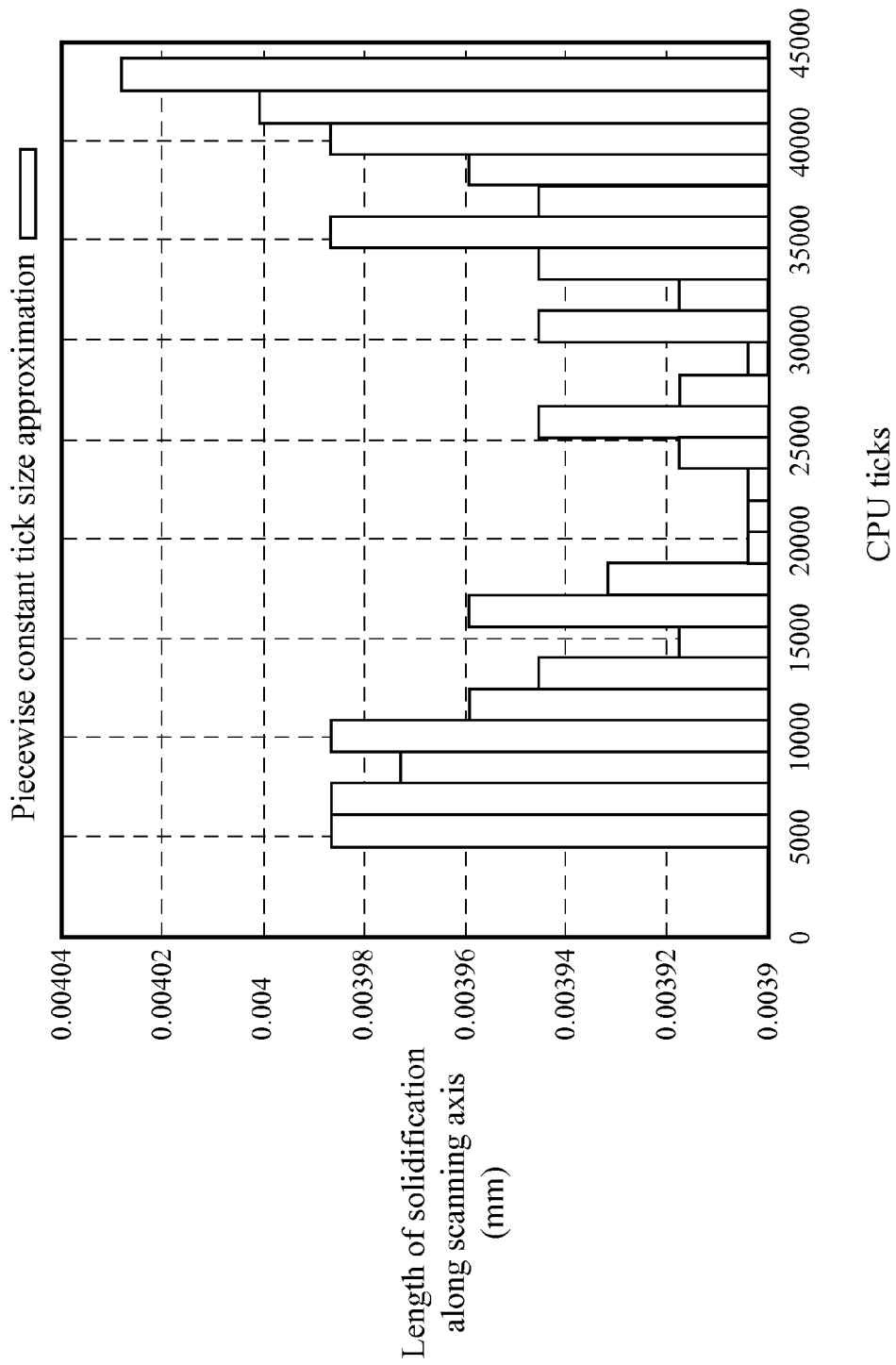
FIG. 16 is a graph depicting an exemplary variation in scanning axis solidification length for a plurality of objects solidified for the same amount of solidification time at different solidification times and positions along a scanning axis.

The variation in scanning (y) axis solidification length per unit solidification time may be characterized using a compensation function c(t), wherein t is a CPU tick value relative to a zero value at which solidification energy would first strike the path generation reference frame border 201 (which may, in some implementations, be indicated by the receipt of a sensor signal from sensor 172 in FIGS. 5C and 5D). An example of such variations is depicted in FIG. 16. The height of each bar in FIG. 16 corresponds to a length of solidification along the scanning (y) axis as the solidification is carried out during the time interval specified by the bar's x-axis coordinates. The data is in the shape of a generally upward opening parabola with a minimum between about 19000 and 23000 ticks. In certain implementations, the compensation function c(t) is a discrete function represented in the manner depicted in FIG. 16. In other implementations, a curve-fitting technique is used to generate an analytical (continuous) function which is used to calculate corrected solidification energy source event data values.

In certain examples, the following relationship is used to calculate corrected solidification energy source event data based on c(t). In these examples, the solidification energy source event data is in the form of CPU tick values. A corrected tick value $t_1^*$ may be calculated from an original tick value $t_1$ in accordance with the equation (7):

$$y(t_1) = y(T_0) + \int_{T_0}^{t^*_1} c(t)dt \tag{7}$$

wherein,
  $y(t_1)$=desired position (mm) along the scanning axis of the path generation reference frame relative to border 201;
  $y(T_0)$=position (mm) of virtual build platform scanning axis border 206 relative to path generation reference frame border 201;
  c(t)=solidified length of solidifiable material per unit time (mm/CPU tick) along the scanning (y) axis at solidification time value t;
  $t^*_1$=corrected solidification time value (CPU ticks); and
  $T_0$=known solidification time value (CPU ticks) corresponding to scanning axis position $y(T_0)$.

Equation (7) is solved for $t^*_i$, which is the desired corrected CPU tick value. In those cases where c(t) is represented as an analytical function, equation (7) may be explicitly solved for the value of $t^*_1$. Where c(t) is represented as a discrete function, numerical integration techniques may be used to obtain a value of $t^*_i$ from equation (7).

In certain implementations of the method of FIGS. 7A and 7B, the values of $t^*_1$ generated from equation (8) are the values of $S_{corr}(q)$ calculated and stored in steps 1041 and 1053. In such implementations, the string data defined by $S_{corr}(q)$ is used by the controller to determine when to activate and deactivate the solidification energy source 126 to selectively provide solidification energy along the scanning (y) axis as the linear solidification device 42 moves along the travel (x) axis.

Figure 17:
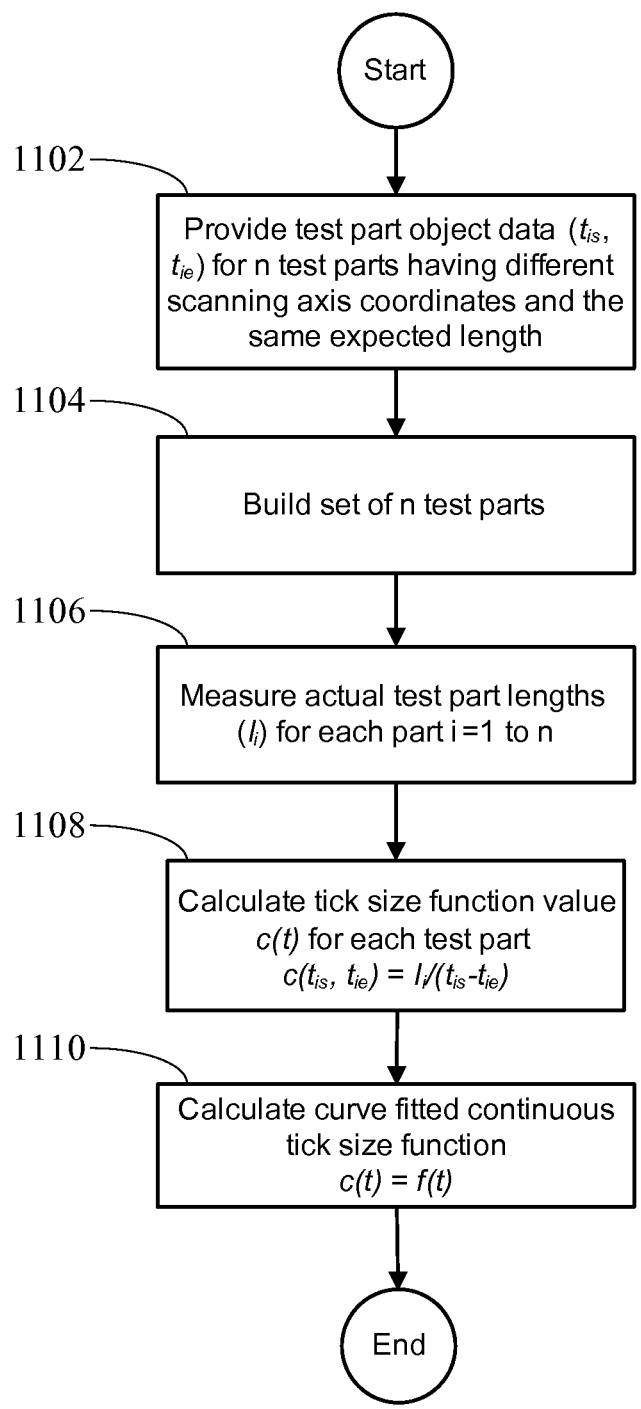
FIG. 17 is a flow chart used to illustrate a method of obtaining a compensation function c(t) that relates solidification length along a scanning axis per unit solidification time to solidification time.

A method of generating the compensation function c(t) will now be described with reference to FIG. 17. In accordance with the method, test part object data comprising pairs of solidification energy source event data is provided. In a preferred example, the pairs of solidification energy source event data comprise a solidification start time $t_{is}$ (CPU ticks) when solidification energy source 126 is activated and a solidification end time $t_{ie}$ (CPU ticks) when solidification energy source 126 is deactivated. Each test part has the same value of $\Delta t = t_{ie} - t_{is}$ but the values of $t_{ie}$ and $t_{is}$ are varied among the different test parts so that the parts are built at different locations along the scanning (y) axis. In step 1104 the test parts are built by solidifying a solidifiable material based on the provided solidification energy source event data.

The scanning (y) axis lengths of each part are measured in step 1106, and in step 1108 values of c(t) are calculated for each pair of solidification energy source event data values $t_{ie}$, $t_{is}$. The resulting data may be plotted as shown in FIG. 16 to define a discrete function c(t). Optionally, step 1110 may be carried out to calculate a curve-fitted analytical function that can be used in equation (8). The resulting compensation function c(t) may then be used to calculated corrected solidification energy source event data values based on a desired scanning (y) axis position within the path generation reference frame 204 and the value of the solidification energy source event data predicted based on the intersection of active voxel facets and the scanning (y) axis of the path generation reference frame and the scanning (y) axis scanning speed S as determined by equation (6).

Figure 18:
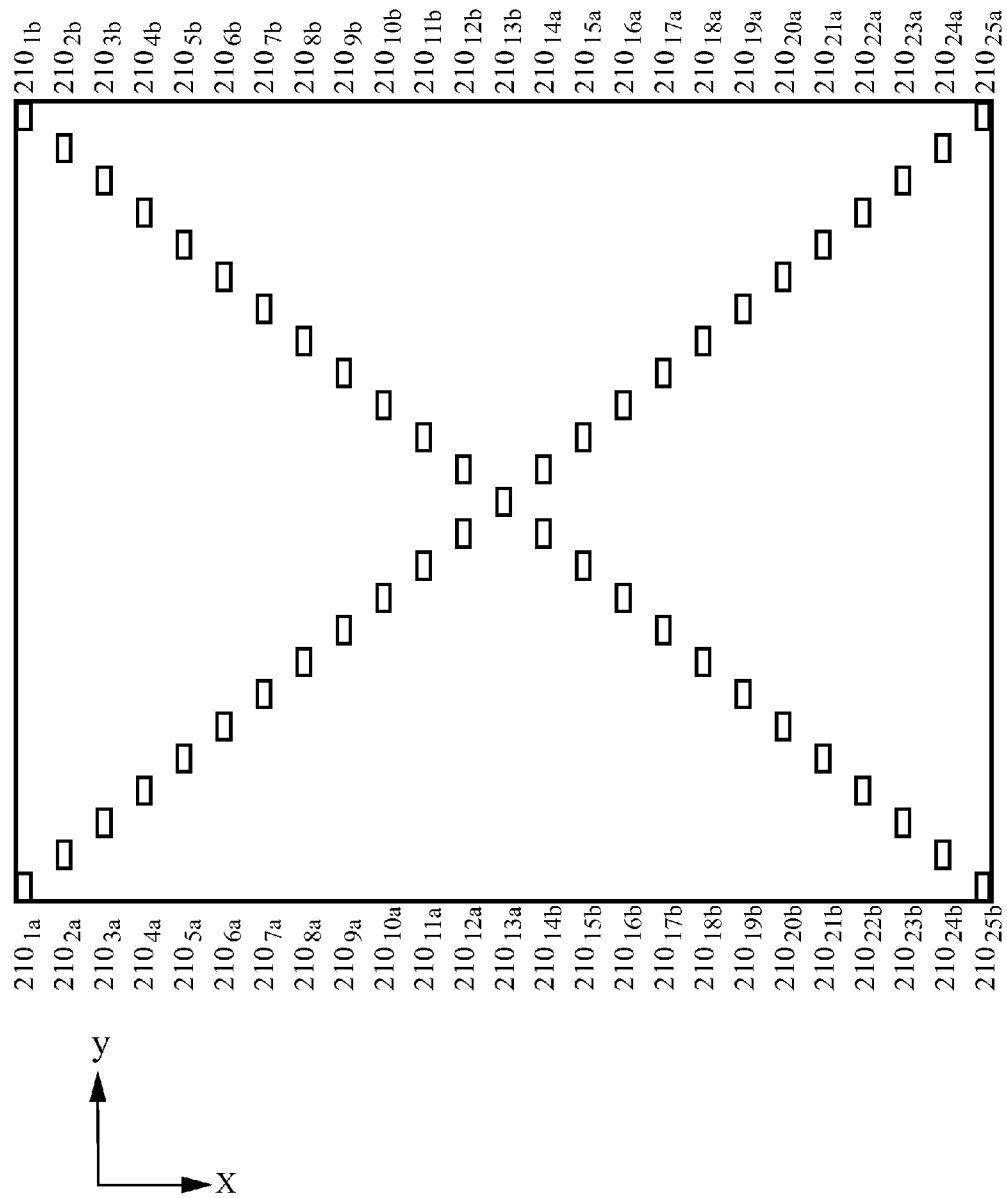
FIG. 18 is schematic depicting a build envelope with a plurality of rectangular test parts used to provide corrected solidification energy source state event data based on the variation of the solidification energy and the area of incident solidification energy as a function of scanning axis position.

An illustrative example of a method of making test parts for use in determining the compensation function c(t) is shown in FIG. 18. In accordance with the method, object data defining two sets of test parts a and b is provided. The object data for the test parts for both sets defines parts of equal dimensions which are preferably rectangular. The object data is used to determine scanning (y) axis coordinates at for each part, and the scanning (y) axis coordinates are used to determine string data for each part. The string data for each part comprises a solidification energy source activation time ($t_{is}$) and deactivation ($t_{ie}$) time. Each part has an equal solidification time Δt (which equals $t_{ie} - t_{is}$ for the part) during which the solidification energy source 126 is active. However, the start $t_{ie}$ and end $t_{ie}$ times of solidification will vary with the scanning (y) axis coordinates used to calculate the string data.

At each scanning (y) axis location among a plurality of locations along the scanning (y), two test parts are made based on object data that corresponds to locations spaced apart from one another along the travel (x) axis. The object data for each pair of test parts preferably defines an equal spacing for each part in the pair from the travel (x) axis center of the build envelope 102. In certain preferred examples, the test parts in each set a and b occupy a unique region of the scanning (y) axis. More preferably, the lower scanning (y) axis coordinate of the lower end of each test part in set a coincides upper scanning (y) axis coordinate of the upper end of the test part that neighbors it immediately to the left (except for part $210_{1a}$ which has no neighbor to the left). At the same time, the upper scanning (y) axis coordinate of the upper end of each test part in set a coincides with the lower scanning (y) axis coordinate of the lowers scanning (y) axis coordinate of the upper end of the test part that neighbors it immediately to the right (except for part $210_{25}a$ which has no neighbor to the right). Conversely, the lower scanning (y) axis coordinate of the lower end of each test part in set b coincides with the upper scanning (y) axis coordinate of the upper end of the test part that neighbors it immediately to the right (except for part $210_{25b}$ which has no neighbor to the right), and the upper scanning (y) axis coordinate of the upper end of each test part in set b coincides with the lower scanning (y) axis coordinate of the lower end of the test part that neighbors it immediately to the left (except for part $210_{1b}$ which has no neighbor to the left). Once the parts are built, the scanning (y) axis lengths of each pair of parts are measured, and the average of their lengths is used as $l_{i\ in}$ step 1108 of FIG. 17.

Referring to FIG. 18, the "a" set of test parts starts at the lower left-hand corner of the build envelope with part $210_{1a}$ and extends diagonally upward to the upper right-hand corner of the build envelope, ending with part $210_{25a}$. The "b" set of test parts starts at the upper left-hand corner of the build envelope with part $210_{1b}$ ending with part $210_{25b}$ in the lower right hand corner. Each set comprises 25 parts, but they share a common "center" part which is oth $210_{13a}$ and $210_{13b}$. Thus, at the center location, only one part is used to calculate $l_i$. The parts comprising each set a and b are preferably spaced apart from one another by equal amounts along the travel (x) axis and preferably have scanning (y) axis coordinates that overlap with the scanning (y) axis coordinates of each part's immediately adjacent neighbor test parts.

The following example illustrates the use of the sets of test parts a and b shown in FIG. 18. Parts $210_{1a}$ and $210_{25b}$ are defined by object string data that corresponds to the same scanning (y) axis coordinates. Thus, test parts $210_{1a}$ and $210_{25b}$ are created, and the scanning (y) axis lengths of each of these parts are measured and averaged to arrive at the value of $l_i$ used in step 1108 of FIG. 17. Similarly, parts $210_{1b}$ and $210_{25a}$ are defined by object string data that corresponds to the same scanning (y) axis coordinates, and the scanning (y) axis lengths of each of these parts are used to arrive at the value of 4 used in step 1108. Each scanning (y) axis position (except the center position) defines a unique pair of test parts in the a and b sets used to calculate the value of $l_i$ for their scanning (y) axis location.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of making a three-dimensional object from a solidifiable material, comprising:
   receiving three-dimensional object data representative of the three-dimensional object;
   identifying active voxels by determining intersections between voxels in a three-dimensional voxel matrix and locations of a model of the three-dimensional object, wherein each voxel has a set of coordinates in a three-dimensional coordinate system, the model is defined by the three-dimensional object data, and the three-dimensional object data comprises a plurality of three-dimensional object data items, each three-dimensional object data item having a set of coordinates in the three-dimensional coordinate system;
   generating a plurality of sets of solidification energy source event data based on the active voxels, wherein each set of solidification energy source event data corresponds to a linear solidification device scan line and a layer of the three-dimensional object, wherein the voxel matrix comprises a plurality of voxels, each voxel has a first dimension dx, a second dimension dy, and a third dimension dz, the first dimension dv is a scan line gap corresponding to a build envelope length L and a maximum number of scans $N_{max}$ of a linear solidification device along the travel axis, the second dimension dy corresponds to a minimum feature size along a scanning axis direction of the linear solidification device, the third dimension dz corresponds to a layer thickness of the solidifiable material, the linear solidification device comprises a rotating energy deflector in optical communication with a source of solidification energy, the rotating energy deflector has a number of facets F, the linear solidification device moves at a speed S along the travel axis, the rotating energy deflector rotates at a rotational frequency ω, and the maximum number of linear scans of the linear solidification device $N_{max}$ is related to the number of facets F, the build envelope travel axis length L, the linear solidification device travel axis speed S, and the rotating energy deflector rotational frequency co in accordance with the following relationship:

$$N_{max}=(L/v_x)*(\omega/60)*F$$

where, $N_{max}$=maximum number of linear scans of the linear solidification device along the travel axis;
L=length of the build envelope along the travel axis (mm);
$v_x$=speed of movement of the linear solidification device along the travel axis (mm/sec);
ω=rotational frequency of rotating energy deflector (revolutions/minute); and
F=number of facets on the rotating energy deflector.

2. The method of claim 1, wherein the three-dimensional object data comprises a plurality of polygon data sets.

3. The method of claim 1, wherein the active voxels are active boundary voxels, and the step of identifying active boundary voxels comprises identifying active boundary voxels by determining intersections between voxels in a three-dimensional voxel matrix and boundary locations of the model of the three-dimensional object.

4. The method of claim 1, wherein the three-dimensional object data is STL data.

5. The method of claim 1, wherein the three-dimensional object data is CAD data.

6. The method of claim 1, further comprising solidifying a plurality of layers of the solidifiable material in accordance with the sets of solidification energy source event data to form the three-dimensional object, wherein following the solidification of each layer, a build platform is moved by the distance dz along a build axis.

7. The method of claim 1, wherein each set of solidification energy source event data comprises a plurality of time values at which the energization state of a linear solidification device changes.

8. The method of claim 1, further comprising positioning the three-dimensional object data in a virtual build envelope within a path generation reference frame comprising a scanning axis and a travel axis, and the step of generating a plurality of sets of solidification energy source event data comprises identifying scanning axis locations within the path generation reference frame at which active voxels are located.

9. The method of claim 8, further comprising centering the virtual build envelope along the path generation reference frame scanning axis.

10. The method of claim 9, further comprising shifting the virtual build envelope along the path generation reference frame scanning axis in accordance with an observed scanning axis shift of the linear solidification device.

11. The method of claim 1, further comprising projecting solidification energy along a scanning axis direction at a plurality of travel axis locations, and the step of projecting solidification energy along a scanning axis direction comprises selectively supplying energy from a linear solidification device to the solidifiable material based on the plurality of sets of solidification energy source event data.

12. The method of claim 11, wherein each set of solidification energy source event data corresponds to one of the travel axis locations in the plurality of travel axis locations.

13. The method of claim 1, wherein the plurality of sets of solidification energy source event data comprises a plurality of sets of original solidification energy source event data items, each original solidification energy source event data item corresponds to a scanning axis position, and the method further comprises calculating a plurality of sets of modified solidification energy source event data comprising a plurality of sets of modified solidification energy source event data items based on a compensation function relating scanning axis solidification length per unit solidification time to solidification time.

14. The method of claim 13, further comprising solidifying the solidifiable material by scanning solidification energy along a scanning axis in accordance with the plurality of sets of modified solidification energy source event data.

15. The method of claim 14, wherein the step of scanning solidification energy along the solidifiable material in accordance with the plurality of sets of modified solidification energy source event data comprises selectively activating a solidification energy source in optical communication with a rotating energy deflector as the rotating energy deflector rotates and the solidification energy source and the rotating energy deflector move along a travel axis.

16. The method of claim 1, wherein the step of generating a plurality of solidification energy source event data based on the active boundary voxels is performed without generating contour data for the three-dimensional object.

17. The method of claim 1, further comprising traversing a linear solidification device along a travel axis and selectively scanning solidification energy on the solidifiable material along a scanning axis based on the plurality of sets of solidification energy source event data.

18. A method of forming a three-dimensional object from a solidifiable material, comprising:
providing a source of the solidifiable material;
providing a linear solidification device, wherein during an object solidification operation, the linear solidification device selectively scans solidification energy along a scanning axis as the linear solidification device travels along a travel axis, the linear solidification device is capable of scanning a maximum number of scan lines $N_{max}$ along the travel axis, each scan line has a length along the scanning axis and is spaced apart from an adjacent scan line by a scan line gap dx along the travel axis, and the linear solidification device has a minimum feature size dy along the scanning axis;
providing a build platform, wherein the build platform moves by a layer thickness dz along a build axis following the solidification of a layer of the solidifiable material;
generating voxel data representative of the three-dimensional object, wherein each voxel corresponds to a set of coordinates in a three-dimensional reference coordinate system and has a first dimension equal to dx, a second dimension equal to dy, and a third dimension equal to dz;

wherein the reference coordinate system has a first axis, a second axis, and a third axis, and the step of generating voxel data representative of the three-dimensional object comprises providing an object model comprising object model data items in the reference coordinate system, defining a voxel matrix in the reference coordinate system, the voxel matrix comprising a plurality of voxels, each voxel in the voxel matrix having a first dimension along the first axis equal to dx, a second dimension along the second axis equal to dy, and a third dimension along the third axis equal to dz, and identifying voxels in the voxel matrix which intersect any of the object model data items, wherein the three-dimensional object data items each define a triangle.

19. The method of claim 18, further comprising generating a plurality of sets of solidification energy source event data based on the voxel data, wherein each set of solidification energy source event data corresponds to a linear solidification device scan line and a layer of the three-dimensional object.

20. The method of claim 19, further comprising providing an object model defined by three-dimensional object data defined within a virtual build platform relative to a path generation reference frame, wherein the voxel data representative of the three-dimensional object comprises voxels in a voxel matrix which intersect the object model, the path generation reference frame has a scanning axis and a travel axis, and the step of generating a plurality of sets of solidification energy source event data comprises identifying scanning axis locations within the path generation reference frame at which voxels in the voxel data intersect the scanning axis of the path generation reference frame.

21. The method of claim 20, further comprising centering the virtual build platform along the path generation reference frame scanning axis.

22. The method of claim 20, further comprising shifting the virtual build platform along the path generation reference frame scanning axis in accordance with an observed scanning axis shift of the linear solidification device.

23. The method of claim 19, wherein each solidification energy source event data set comprises a plurality of time values at which the energization state of the solidification energy source changes.

24. The method of claim 19, wherein the step of generating a plurality of sets of solidification energy source event data based on the voxel data comprises identifying consecutive sequences of active voxels along the second axis at fixed locations along the first and third axes in the voxel matrix.

25. A method of forming a three-dimensional object from a solidifiable material, comprising:

providing a source of the solidifiable material;

providing a linear solidification device, wherein during an object solidification operation, the linear solidification device selectively scans solidification energy along a scanning axis as the linear solidification device travels along a travel axis, the linear solidification device is capable of scanning a maximum number of scan lines $N_{max}$ along the travel axis, each scan line has a length along the scanning axis and is spaced apart from an adjacent scan line by a scan line gap dx along the travel axis, and the linear solidification device has a minimum feature size dy along the scanning axis;

providing a build platform, wherein the build platform moves by a layer thickness dz along a build axis following the solidification of a layer of the solidifiable material;

generating voxel data representative of the three-dimensional object, wherein each voxel corresponds to a set of coordinates in a three-dimensional reference coordinate system and has a first dimension equal to dx, a second dimension equal to dv, and a third dimension equal to dz, generating a plurality of sets of solidification energy source event data based on the voxel data, wherein each set of solidification energy source event data corresponds to a linear solidification device scan line and a layer of the three-dimensional object;

wherein the reference coordinate system has a first axis, a second axis, and a third axis, and the step of generating voxel data representative of the three-dimensional object comprises providing an object model comprising object model data items in the reference coordinate system, defining a voxel matrix in the reference coordinate system, the voxel matrix comprising a plurality of voxels, each voxel in the voxel matrix having a first dimension along the first axis equal to dx, a second dimension along the second axis equal to dv, and a third dimension along the third axis equal to dz, and identifying voxels in the voxel matrix which intersect any of the object model data items;

wherein each set of solidification energy source event data comprises a plurality of solidification energy source event data values, and the method further comprises generating a plurality of sets of corrected solidification energy source event data, wherein each set of corrected solidification source event data comprises a plurality of corrected solidification energy source event data values, and each corrected solidification energy source event data value is calculated based on a compensation function relating scanning axis solidification length per unit solidification time to solidification time.

26. The method of claim 25, wherein the step of generating a plurality of sets of solidification energy source event data comprises identifying active voxels by determining intersections between the voxels and locations of a model of the three-dimensional object, wherein the model of the three-dimensional object is defined by three-dimensional object data comprising a plurality of three-dimensional object data items, each three-dimensional object data item having a set of coordinates in the reference coordinate system.

27. The method of claim 25, wherein the step of generating solidification energy source event data from the voxel data is carried out without generating contour data for the three-dimensional object.

28. The method of claim 25, further comprising traversing the linear solidification device along the travel axis and selectively scanning solidification energy on the solidifiable material along the scanning axis based on the voxel data representative of the three-dimensional object.

29. A method of correcting solidification energy source event data, comprising:

providing a set of solidification energy source event data comprising a plurality of solidification energy source event data items, wherein each solidification energy source event data item corresponds to a position along a scanning axis;

generating a set of corrected solidification energy source event data comprising a plurality of corrected solidification energy source event data items, wherein each corrected solidification energy source event data item is generated from a corresponding solidification energy source event data item based on a varying solidification energy profile along the scanning axis.

30. The method of claim 29, wherein each corrected solidification energy source event data item is generated from a corresponding solidification energy source event data item based on a compensation function relating scanning axis solidification length per unit solidification time to solidification time.

31. The method of claim 29, wherein plurality of solidification energy source event data items comprises a plurality of time values at which the energization state of the solidification energy source changes, and the plurality of corrected solidification energy source event data items comprises a plurality of corrected time values at which the energization state of the solidification energy source changes.

32. The method of claim 31, wherein the scanning axis is a path generation reference frame scanning axis, and the solidification energy source event data is defined relative to a virtual build envelope having a scanning axis border within the path generation reference frame, each time value corresponds to a position along the path generation reference frame scanning axis, each corrected time value corresponds to a position along the path generation reference frame scanning axis and is related to its corresponding time value in accordance with the following relationship:

$$y(t_1) = y(T_0) + \int_{T_0}^{t^*_1} c(t) dt$$

wherein, $y(t_1)$=position along the path generation reference frame scanning axis corresponding to time value $t_1$;

$y(T_0)$=position of virtual build envelope scanning axis border in a path generation reference frame;

$c(t)$=compensation function relating solidified length of solidifiable material per unit time to solidification time;

$t^*_1$=corrected time value; and $T_0$=time value at which solidification energy reaches position y(T0) along the scanning axis.

33. The method of claim 32, further comprising solidifying a plurality of objects during an equal solidification period at varying positions along the path generation reference frame scanning axis and determining the function c(t) based on the measured lengths of the objects along the scanning axis.

34. The method of claim 33, wherein the function c(t) is related to the measured lengths $l_i$ of the plurality of objects as follows:

$$c(t) = l_i/(t_{ie} - t_{is})$$

wherein, c(t)=length of solidification energy per unit solidification time along scanning axis at time t;

t=solidification time;

$l_i$=length of bar i along scanning axis;

$t_{ie}$=solidification time at which solidification energy reaches the start of bar i along the scanning axis; and $t_{is}$=solidification time at which solidification energy reaches the end of bar i along the scanning axis.

\* \* \* \* \*

UNITED STATES PATENT AND TRADEMARK OFFICE
CERTIFICATE OF CORRECTION

| | |
|---|---|
| PATENT NO. | : 9,586,364 B2 |
| APPLICATION NO. | : 14/091683 |
| DATED | : March 7, 2017 |
| INVENTOR(S) | : Ali El-Siblani et al. |

It is certified that error appears in the above-identified patent and that said Letters Patent is hereby corrected as shown below:

In the Claims

Column 41, Line 3, between "dimension" and "is" delete "dv" and insert --dx--

Column 41, Line 21, between "frequency" and "in" delete "co" and insert --ω--

Column 44, Line 9, between "to" and "and" delete "dv" and insert --dy--

Column 44, Line 25, between "to" and "and" delete "dv" and insert --dy--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*